US005798985A

United States Patent [19]

Nakajima

[11] Patent Number: 5,798,985

[45] Date of Patent: Aug. 25, 1998

[54] ELECTRONIC WATCH AND METHOD OF DRIVING THE SAME

[75] Inventor: Fumio Nakajima, Tokyo, Japan

[73] Assignee: Citizen Watch Co., Ltd., Tokyo, Japan

[21] Appl. No.: 718,900

[22] Filed: Sep. 24, 1996

[30] Foreign Application Priority Data

Sep. 29, 1995 [JP] Japan .................................... 7-252153

[51] Int. Cl.[6] ............................ G04B 1/00; H01M 10/46

[52] U.S. Cl. ................................ 368/64; 368/204; 320/21

[58] Field of Search ........................ 368/64, 66, 203–205; 320/1, 2, 21, 41, 42, 61; 323/281, 282

[56] References Cited

U.S. PATENT DOCUMENTS

| | | | |
|---|---|---|---|
| 4,397,563 | 8/1983 | Ichinose | 368/204 |
| 4,730,287 | 3/1988 | Yoshino et al. | 368/205 |
| 4,939,707 | 7/1990 | Nagao | 368/64 |
| 5,001,685 | 3/1991 | Hayakawa | 368/204 |
| 5,130,960 | 7/1992 | Hayakawa | 368/204 |

FOREIGN PATENT DOCUMENTS

| | | |
|---|---|---|
| 48-60227 | 8/1973 | Japan . |
| 4-81754 | 10/1987 | Japan . |

*Primary Examiner*—Vit W. Miska

*Attorney, Agent, or Firm*—Armstrong, Westerman, Hattori, McLeland & Naughton

[57] ABSTRACT

An electronic watch comprises a power supply 1 for generating electric energy by using external energy, a booster portion 2 having at least two booster circuits for sequentially repeating charging by the power supply 1 and boosting and discharging a charged voltage, a storage portion 3 for storing a charge discharged by the booster portion 2, a clock output portion 6 connected to an output terminal of the storage portion 3 and also connected to the power supply 1 by way of a reverse-blocking diode 8 for blocking the stored voltage from reversely flowing to the power supply 1, and a first voltage comparator portion 4 serving as a control portion, wherein the first voltage comparator portion 4 outputs a control signal for switching between charging and discharging of each booster circuit constituting the booster portion 2. Accordingly, effective charging can be made without being influenced by an internal resistance of the power supply 1, thereby reducing the variation of the stored voltage.

7 Claims, 18 Drawing Sheets

ELECTRONIC WATCH AND METHOD OF DRIVING THE SAME

BACKGROUND OF THE INVENTION

1. Field of the Invention

The present invention relates to an electronic watch including an electric energy generating means as a power supply such as an electrothermic type generator or a solar battery for generating electric energy having a relatively small voltage by external energy and a booster circuit for boosting a voltage of the power supply, and a method of driving the electronic watch.

2. Description of the Prior Art

There is a boosting technique employed by a conventional electronic watch, which is, for example, disclosed in JP-A 48-60227.

FIG. 23 is a circuit diagram showing an arrangement of the booster circuit, and FIG. 24 is an equivalent circuit showing a state where a charge is stored in each capacitor of the booster circuit. FIG. 25 is an equivalent circuit showing a state where the charge stored in each capacitor is stored in a booster output capacitor.

The arrangement of the conventional booster circuit will be now described with reference to FIG. 23. The booster circuit comprises a power supply E, a switching operation circuit 101, a plurality of (three in FIG. 23) booster capacitors C, a booster output capacitor CO, N-type field effect transistors (hereinafter referred to as "NFETs") S1 to S10 for switching between the booster capacitors C and the booster output capacitor CO and an inverter 11. Denoted by RL is a load resistor.

The operation of the booster circuit will be now described with reference to the equivalent circuits shown in FIGS. 24 and 25.

When an output signal P1 of the switching operation circuit 101 is changed to a low level LOW (hereinafter referred to as goes "L"), the NFETs S7 to S10 are turned off (hereinafter referred to as simply OFF). At this time, since an output of the inverter 11 is changed to a high level HIGH (hereinafter simply referred to as goes "H"), the NFETs S1 to S6 are turned on (hereinafter referred to as simply ON). Accordingly, as shown in FIG. 24, the three booster capacitors C are connected in parallel to the power supply E so that they are charged until each voltage thereof is equal to the voltage of the power supply E.

Thereafter, when the output signal P1 of the switching operation circuit 101 goes "H", the NFETs S7 to S10 are ON and the output of the inverter 11 goes "L" so that the NFETs S1 to S6 are OFF. Accordingly, as shown in FIG. 25, the three booster capacitors C and the power supply E are connected in series to one another so as to store a charge in the booster output capacitor CO, namely, to charge the booster output capacitor CO. Successively, when the output signal P1 is alternately switched to "H" or "L", the booster output can be supplied to the booster output capacitor CO.

However, in the conventional booster circuit, the power supply E is connected in series to a plurality of booster capacitors C as shown in FIG. 25 when the charge is stored in the booster output capacitor CO. Since the capacitance value of the booster output capacitor CO is large, a time constant involved in charging becomes large when an internal resistance of the power supply is large. As a result, it takes time for storing the charge in the booster output capacitor CO. Further, there is another problem that power is not effectively received from the booster output capacitor CO owing to the resistance loss of the internal resistance of the power supply.

Still further, in the conventional booster circuit, the charging continues until the charge voltage of the booster capacitor C is equal to the voltage of the power supply E. Accordingly, there is a problem that the charging efficiency is lowered since the power to be received from the booster capacitor C is reduced as the charging time elapses.

These problems will be described more in detail with reference to a graph of FIG. 22, wherein the axis of abscissas represents time and is graduated in time constants RC. Suppose that the internal resistance value of the power supply is R, and the parallel combined capacitance value of the booster capacitor is C. The axis of ordinates represents a voltage and a power, and the value obtained when the capacitor C is fully charged by the power-supply voltage E is standardized by 1. Vc shown by one dotted chain lines represents a charge voltage of the booster capacitor, Wr shown by a solid line is a power to be supplied to the load resistor which is balanced with the power supply, and Wc shown by the broken line is a power to be received from the capacitor having the capacitance value C.

As shown in FIG. 22, a power expressed by $Wr=E^2C/2$ is supplied to the load resistor RL which is balanced with the power supply upon elapse of time expressed by t=2RC seconds after the power supply is connected to the load, and a power of about 75% of the power of $Wr=E^2C/2$ is received from the capacitor having the capacitance value C but with no initial charge. The charge voltage Vc at this time is about 86% of the power-supply voltage E.

Further, although the charge voltage Vc becomes about 98% of the power-supply voltage E after the elapse of time of 2RC seconds, the power to be taken out is two times that of the capacitor load C, namely, it is expressed by $Wr=E^2C$ while the power Wc of the capacitor load C is the same, namely, it is expressed by $E^2C/2$ and the charging efficiency is about fifty percent.

The output voltage of the booster output capacitor CO constituting the booster circuit is reduced gradually in accordance with the power consumption of the load resistor RL when each booster capacitor C is connected in parallel to the power supply E to charge the booster output capacitor CO shown in FIG. 24. Whereupon, when each booster capacitor C is connected in series to the power supply E so as to charge the booster output capacitor CO, the output voltage of the booster output capacitor CO is increased as shown in FIG. 25. Accordingly, there is a problem that a large pulsation is generated in the output voltage.

Since charging and discharging of the booster capacitor is switched to each other at a given time intervals, there is a problem in this booster circuit that the voltage to be applied to the booster output capacitor CO is varied when the voltage of the power supply E is varied, so that the charging efficiency is lowered and the output voltage to be applied to the load resistor RL is also varied.

SUMMARY OF THE INVENTION

It is an object of the invention to solve the aforementioned problems of the conventional electronic watch employing such a booster circuit, and to provide an electronic watch capable of reducing a charging time, and of charging effectively even if there is a power supply employed having a large internal resistance therein, and of reducing pulsation and variation of an output power voltage.

Accordingly, the electronic watch of this invention comprises a power supply for generating electric energy by external energy, a booster means comprising at least two booster circuits for sequentially repeating charging by the power supply, boosting a charged voltage, and discharging the boosted voltage, a storage means for storing therein the voltage or charge discharged by the booster means, a clock output means connected to an output terminal of the storage means, and also connected to the power supply by way of a reverse-blocking means for preventing the stored voltage from flowing reversely to the power supply, and a control means for outputting a control signal for switching between charging and discharging of each of the booster circuits constituting the booster means.

Accordingly, when one of a plurality of booster circuits constituting the booster means boosts the charged voltage and discharges the storage means so as to store the charge of the boosted voltage in the storing means, the other booster circuits are charged by the power supply, so that charging can be effectively carried out and the variation of the stored voltage (output voltage) of the storage means is reduced. Further, charging can be carried out without being influenced by internal resistance of the power supply since the reverse-blocking means is reversely biased so as to block the output terminal of the storage means and the power supply when the stored voltage exceeds the power-supply voltage.

The switching between charging and discharging of the plurality of booster circuits constituting the booster means can be controlled by a control signal from the clock output means and a charging time.

If the control means includes a reference voltage generating circuit and a voltage comparator circuit wherein a reference voltage generated by the reference voltage generating circuit is compared with a voltage which is charged in a capacitor of a charging booster circuit of the booster means so as to output the control signal (corresponding to a first voltage comparator means), more suitable switching between charging and discharging can be performed.

If an output terminal of the storage means is connected to the clock output means by way of a switching means, and the electronic watch further includes a voltage comparator means (corresponding to a second voltage comparator means) for comparing a stored voltage in the storage means with a supply voltage of the power supply so as to turn off the switching means until the stored voltage reaches the supply voltage, and to turn on the switching means after the stored voltage reaches the supply voltage, so initial charging of the storage means can be performed quickly.

The invention further provides a method of driving an electronic watch comprising connecting a plurality of internal capacitors of one of a plurality of booster circuits constituting the booster means in series to one another for discharging the storage means, and connecting a plurality of internal capacitors of other booster circuits in parallel to the power supply for charging the storage means, comparing a voltage of a capacitor of the charging booster circuit with a reference voltage generated by the reference voltage generating circuit by the voltage comparator circuit in response to a sampling signal outputted by the clock output means, and sequentially discharging the voltage of the capacitor in the storage means whenever the voltage thereof exceeds the reference voltage, whereby effective charging of the storage means can be performed.

In this driving method, a voltage adjacent to a transition point of charging characteristics curve of each capacitor of a charging booster circuit is generated as a reference voltage in the reference voltage generating circuit, thereby permitting the charging efficiency to be most effective.

Further, if the electronic watch of the invention further includes a control means for controlling cycles of charging and discharging of each booster circuit constituting the booster means in response to the clock signal outputted by the clock output means and a voltage of a capacitor of the charging booster circuit in the booster means, charging efficiency can be made optimal.

The control means comprises a reference voltage generating circuit for generating a reference voltage, a voltage detection circuit for comparing the reference voltage and the voltage of the capacitor of the charging booster circuit in the booster means thereby outputting a detection signal, and a signal generating circuit for outputting a booster control signal for controlling cycles of charging and discharging of each booster circuit constituting the booster means in response to the detection signal and the clock signal.

Further, the signal generating circuit comprises an up/down control circuit for determining a cycle of the booster control signal, a frequency regulator circuit operable in response to the cycle determined by the up/down control circuit, and a booster control circuit for outputting the booster control signal in response to an output of the frequency regulator circuit.

In an electronic watch according to the invention, each booster circuit constituting the booster means comprises a plurality of capacitors and a connection switching means for connecting each capacitor in parallel to the power supply when charging the booster circuit, and for connecting each capacitor in series to the storage means when discharging the booster circuit.

The above and other objects, features and advantages of the invention will be apparent from the following detailed description which is to be read in conjunction with the drawings.

DETAILED DESCRIPTION OF THE PREFERRED EMBODIMENTS

The first to third embodiments of the invention will be now described with reference to FIGS. 1 to 22.

First Embodiment (FIGS. 1 to 9)

Figure 1:
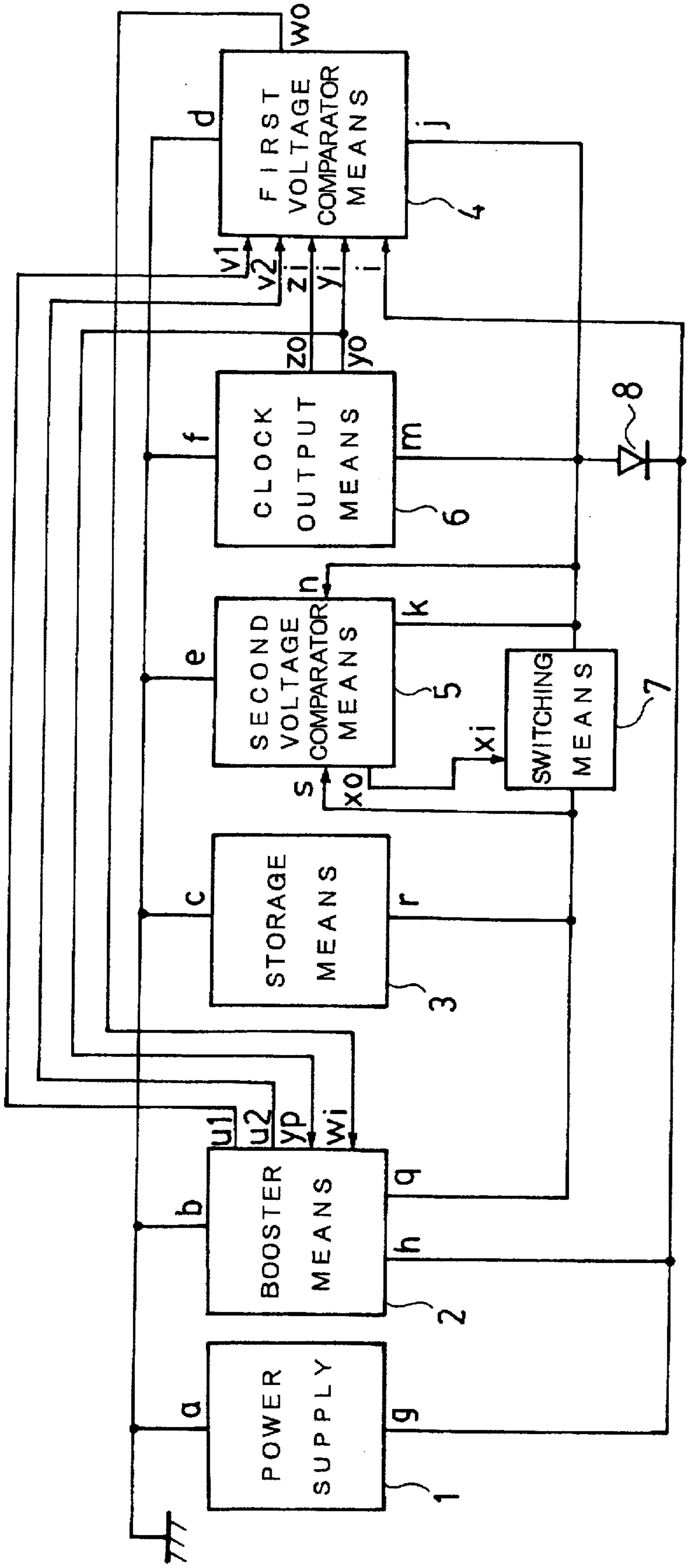
FIG. 1 is a block diagram showing a circuit arrangement of an electronic watch according to a first embodiment of the invention.

FIG. 1 is a block diagram showing a circuit arrangement of an electronic watch according to a first embodiment of the invention. The electronic watch comprises a power supply 1, a booster means 2, a storage means 3, a first voltage comparator means 4, a second voltage comparator means 5, a clock output means 6, a switching means 7 and a reverse-blocking diode 8 serving as a reverse-blocking means.

A high potential side terminal a of the power supply 1 is grounded and is connected to ground terminals b, c, d, e and f of the booster means 2, the storage means 3, the first voltage comparator means 4, the second voltage comparator means 5 and the clock output means 6. A lower potential side terminal g of the power supply 1 for outputting a power-supply voltage is connected to a power supply terminal h of the booster means 2, a reference power supply terminal i of the first voltage comparator means 4 and a cathode terminal of the reverse-blocking diode 8.

An anode terminal of the reverse-blocking diode 8 is connected to power supply terminals j, k, and m of the first voltage comparator means 4, the second voltage comparator means 5 and the clock output means 6, and also connected to a control terminal n of the second voltage comparator means 5 and one terminal p of the switching means 7.

A booster output terminal q of the booster means 2 is connected to a power supply terminal r of the storage means 3, a second control terminal s of the second voltage comparator means 5 and the terminal t of the switching means 7. A first capacitance output terminal u1 of the booster means 2 is connected to a first comparator terminal v1 of the first voltage comparator means 4, and a second capacitance output terminal u2 is connected to a second comparator terminal v2 of the first voltage comparator means 4.

A switching signal output terminal wo of the first voltage comparator means 4 is connected to a switching terminal wi of the booster means 2, and an output terminal xo of the second voltage comparator means 5 is connected to a control terminal xi of the switching means 7.

A sampling signal output terminal yo of the clock output means 6 is connected to a pulse terminal yp of the booster means 2 and an enable terminal yi of the first voltage comparator means 4, and a power-on reset terminal zo of the clock output means 6 is connected to a reset input terminal zi of the first voltage comparator means 4.

The power supply 1 is an electrothermic type generator which generates electric energy on the basis of the principle of the Seebeck Effect, and it is structured as a module comprising a combination of a plurality of semiconductor element pairs composed of a p-type semiconductor material and an n-type semiconductor material which are connected in series to each other.

The electrothermic type generator includes a hot pole at one end surface and a cold pole at the other end surface, wherein the hot pole is differentiated from the cold pole in temperature, thereby generating electric energy. When the electrothermic type generator is employed by a wrist watch as a power supply, it is structured in such a manner that a back side thereof contacting a human skin forms the hot pole and a front side thereof contacting the atmosphere forms the cold pole.

Circuit arrangements of each block in FIG. 1 will be now described with reference to FIGS. 2 to 4.

Figure 2:
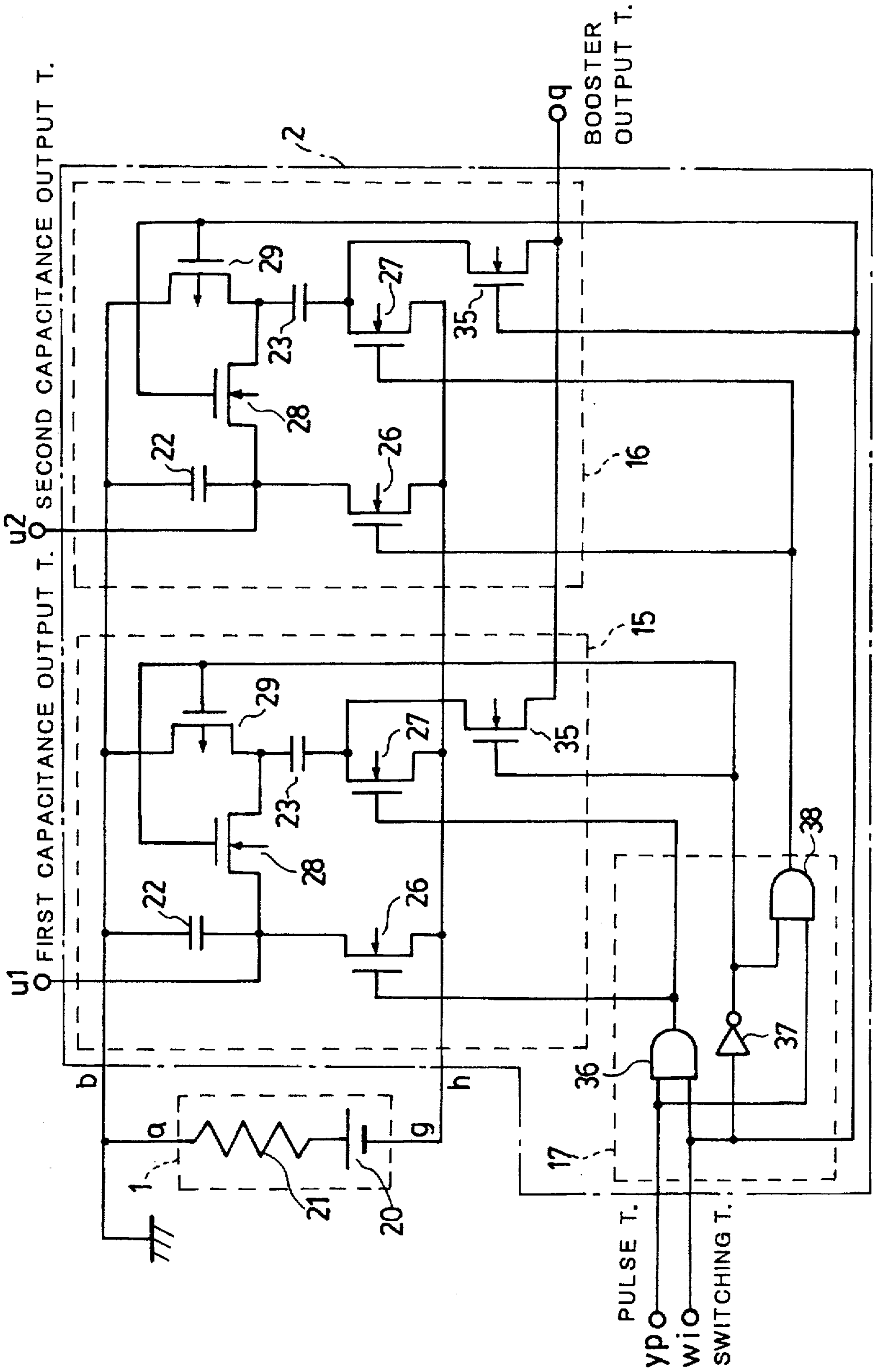
FIG. 2 is a circuit diagram showing internal arrangements of a power supply 1 and a booster means 2 in FIG. 1.

FIG. 2 is a circuit diagram showing internal arrangements of the power supply 1 and the booster means 2 in FIG. 1.

The power supply 1 is the electrothermic type generator comprising a combination of a plurality of thermionic element pairs as described above, and it is represented equivalently in FIG. 2 as a voltage source 20 and an internal resistor 21. The power supply 1 employs several thousand thermionic element pairs for obtaining an unloaded voltage of about 1 to 2 Volts necessary for activating the clock output means 6 shown in FIG. 1, wherein the internal resistor 21 has a resistance of several ten kilo ohms or more.

The internal resistor 21 of the power supply 1 is grounded at the high potential side with respect to the voltage source 20. However, this is equivalently represented and it is generally considered that the internal resistor 21 is distributed equally inside the voltage source 20.

The booster means 2 shown in FIG. 2 comprises a first booster circuit 15, a second booster circuit 16 and a control circuit 17.

The first booster circuit 15 comprises a first capacitor 22, a second capacitor 23, first, second, third and fourth N-channel MOS transistors (hereinafter referred to as "N-MOSTs") 26, 27, 28, and 35 and a P-channel MOS transistor (hereinafter referred to as "P-MOST") 29.

The second booster circuit 16 has the same circuit arrangement as the first booster circuit 15 except that the first capacitance output terminal u1 of the first booster circuit 15 is merely changed to the second capacitance output terminal u2.

The control circuit 17 comprises a first AND circuit 36, an inverter 37 and a second AND circuit 38. Each AND circuit 36, 38 is two input type.

A connecting condition of the constitutional elements of these circuits will be now described.

One input terminal of the first AND circuit 36 is connected to one input terminal of the second AND circuit 38 and an external pulse terminal yp, and the external pulse terminal yp is connected to the sampling signal output terminal yo of the clock output means 6 shown in FIG. 1.

The other input terminal of the first AND circuit 36 is connected to an input terminal of the inverter 37, each control terminal of the third and fourth N-MOSTs 28 and 35 and the P-MOST 29 constituting the second booster circuit 16, and the external switching terminal wi, and the external switching terminal wi is connected to the switching signal output terminal wo of the first voltage comparator means 4.

An output terminal of the first AND circuit 36 is connected to each control terminal of the first and second N-MOSTs 26 and 27 respectively constituting the first booster circuit 15.

An output terminal of the inverter 37 is connected to the other input terminal of the second AND circuit 38 and each control terminal of the third and fourth N-MOSTs 28 and 35 and the P-MOST 29 constituting the first booster circuit 15.

An output terminal of the second AND circuit 38 is connected to each control terminal of the first and second N-MOSTs 26 and 27 constituting the second booster circuit 16.

The high potential side terminal a of the power supply 1 is grounded and is connected to one terminal of the first capacitors 22 and one terminal of the P-MOSTs 29 in the first and second booster circuits 15 and 16. The lower potential side terminal g of the power supply 1 to which a power-supply voltage is applied is connected to one terminal of the first and second N-MOSTs 26 and 27 in the first and second booster circuits 15 and 16.

Each other terminal of the first capacitors 22 in the first and second booster circuits 15 and 16 are connected to the other terminal of the first N-MOST 26 and the other terminal of the third N-MOST 28. The other terminal of the first capacitor 22 in the first booster circuit 15 is connected to the external first capacitance output terminal ul, and the other terminal of the first capacitor 22 in the second booster circuit 16 is connected to the second capacitance output terminal u2.

The first and second capacitance output terminals ul and u2 are connected respectively to the first and second comparator terminals v1 and v2 of the first voltage comparator means 4 shown in FIG. 1.

The other terminals of the P-MOSTs 29 in the first and second booster circuits 15 and 16 are connected to the other terminal of the third N-MOST 28 and one terminal of the second capacitor 23. Each other terminal of the second capacitors 23 are connected to each other terminal of the second N-MOSTs 27 and each terminal of the fourth N-MOSTs 35. Each other terminal of the fourth N-MOSTs 35 is connected to the lower potential side terminal, i.e., external booster output terminal g.

Figure 3:
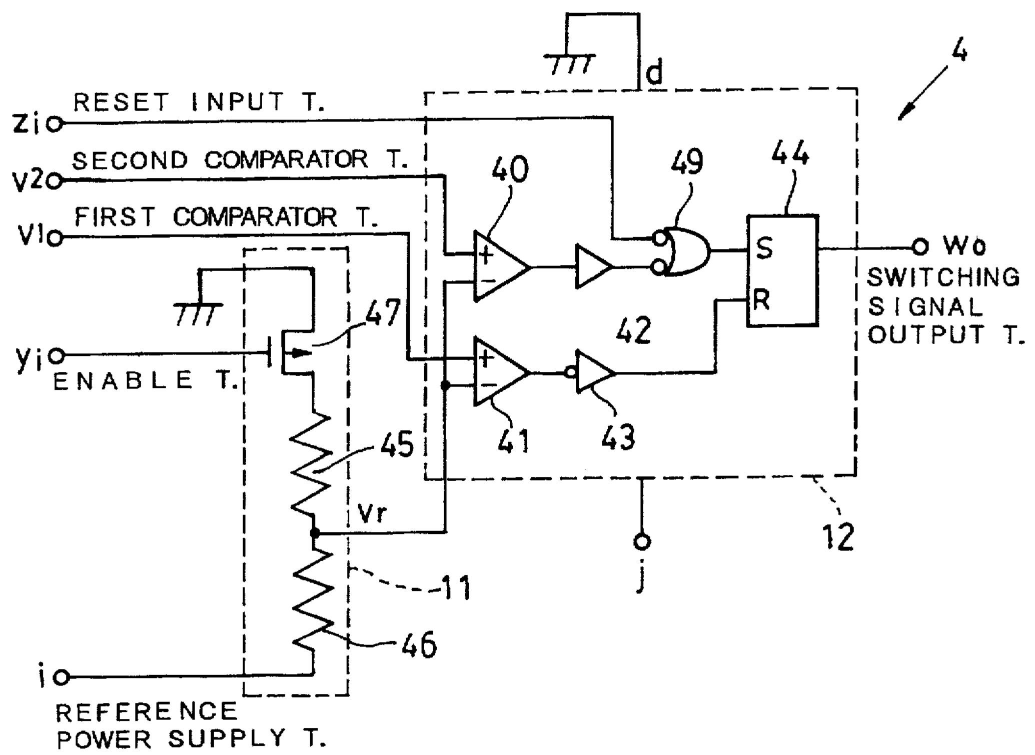
FIG. 3 is a circuit diagram showing an internal arrangement of a first voltage comparator means 4 in FIG. 1.

FIG. 3 is a circuit diagram showing an internal arrangement of the first voltage comparator means 4 in FIG. 1.

The first voltage comparator means comprises a reference voltage generating circuit 11, which is composed of a first resistor 45, a second resistor 46, and a P-MOST 47, and a voltage comparator circuit 12 composed of a first comparator 40, a second comparator 41, a buffer 42, an inventor 43, a set-reset-flip-flop 44 (hereinafter referred to as "SR-FF"), and a two-input NAND circuit 49.

A connecting condition of the constitutional elements of the reference voltage generating circuit 11 and the voltage comparator circuit 12 will be now described.

One terminal of the P-MOST 47 constituting the reference voltage generating circuit 11 and the ground terminal d of the voltage comparator circuit 12 are connected to the high potential side terminal a of the power supply 1 shown in FIG. 1, and the other terminal of the P-MOST 47 is connected to one terminal of the first resistor 45. The other terminal of the first resistor 45 is connected to one terminal of the second resistor 46 and inversion input terminals of the first comparator 40 and the second comparator 41 of the voltage comparator circuit 12, and the other terminal of the second resistor 46 is connected to the reference power supply terminal i.

The reference power supply terminal i is connected to the lower potential side terminal g of the power supply 1 shown in FIG. 1. The control terminal of the P-MOST 47 is connected to the enable terminal yi, and the enable terminal yi is connected to the sampling signal output terminal yo of the clock output means 6 shown in FIG. 1.

In the voltage comparator circuit 12, the second comparator terminal v2 is connected to a non-inversion input terminal of the first comparator 40 and the first comparator terminal v1 is connected to a non-inversion input terminal of the second comparator 41. The first and second comparator terminals v1 and v2 are connected to the first and second capacitance output terminals ul and u2 shown in FIG. 2.

An output terminal of the first comparator 40 is connected to one input terminal of the two-input NAND circuit 49 by way of the buffer 42. The other input terminal of the two-input NAND circuit 49 is connected to the reset input terminal zi and the reset input terminal zi is connected to the power-on reset terminal zo of the clock output means 6 shown in Fig. 1. An output terminal of the two-input NAND circuit 49 is connected to a set terminal S of the SR-FF 44, and an output terminal of the second comparator 41 is connected to the reset terminal R of the SR-FF 44 by way of an inverter 43.

An output terminal of the SR-FF 44 is connected to the switching signal output terminal wo, and the switching signal output terminal wo is connected to the switching terminal wi of the booster means 2 shown in FIGS. 1 and 2.

The power supply terminal j of the voltage comparator circuit 12 is connected to the anode terminal of the reverse-blocking diode 8 shown in FIG. 1.

The reference voltage Vr outputted from the reference voltage generating circuit 11 in the first voltage comparator means 4 is determined by the voltage applied to the reference power supply terminal i and a ratio between the sum of the resistance value of an on-resistance of the P-MOST 47 and the resistance value of the first resistor 45 and the resistance value of the second resistor 46.

When temperature characteristics of the on-resistance of the P-MOST 47 is substantially equal to those of the first resistor 45 and the second resistor 46, the reference voltage Vr is stable. However, when the temperature characteristics are different from each other, it is necessary that the on-resistance of the P-MOST 47 has a resistance value which is sufficiently smaller than resistance values of the first resistor 45 and the second resistor 46.

Figure 4:
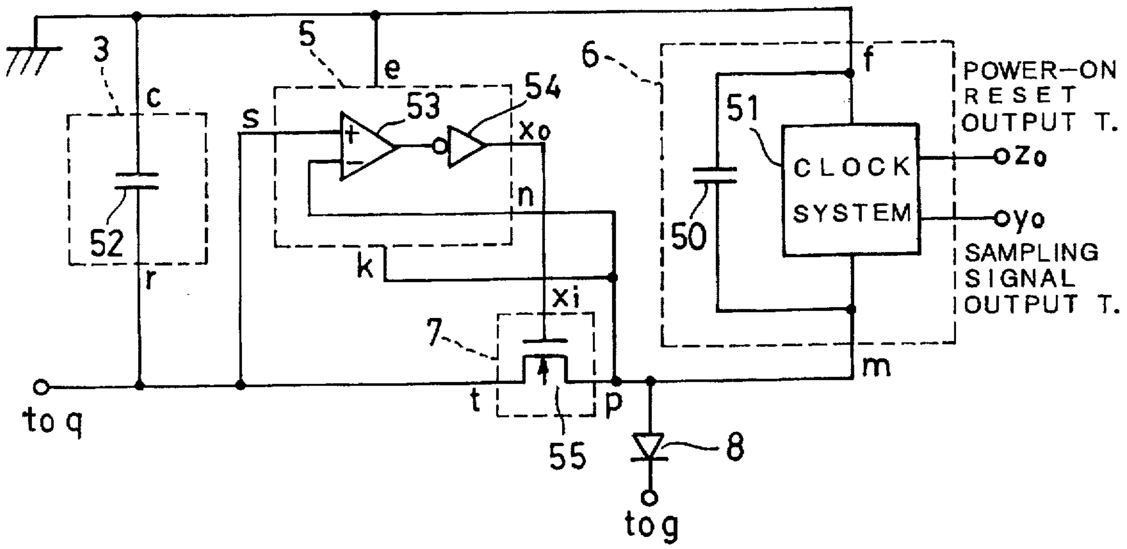
FIG. 4 is a circuit diagram showing internal arrangements of the booster means 2, a second voltage comparator means 5 and a clock output means 6 in FIG. 1.

FIG. 4 is a circuit diagram showing internal arrangements of the storage means 3, the second voltage comparator means 5, the clock output means 6, and the switching means 7 in FIG. 1.

The storage means 3 is a general charging capacitor (condenser) 52. The second voltage comparator means 5 comprises a comparator 53 and an inverter 54 which are connected in series to each other. The clock output means 6 comprises a clock system 51 composed of a movement and a driving circuit, and a capacitor 50 connected in parallel to the clock system 51 to supply a stable power. The switching means 7 comprises an N-MOST 55.

Although the internal arrangement of the clock system 51 is not illustrated, it generally comprises a system of a crystal wrist watch comprising a crystal oscillation circuit, a frequency divider, a waveform generating circuit, a driving circuit, an electromechanical transducer, gears, and a display mechanism.

A connecting condition of the constituting components of these means is now described.

One terminal of the charging capacitor 52 constituting the storage means 3 is a ground terminal c which is connected to the high potential side terminal a of the power supply 1 shown in FIG. 1 together with the ground terminal e of the second voltage comparator means 5 and the ground terminal f of the clock output means 6.

The other terminal of the charging capacitor 52 constituting the storage means 3 is the power supply terminal r, which is connected to the booster output terminal q of the booster means 2 shown in FIG. 1 and 2 together with the non-inversion input terminal of the comparator 53 serving as the second control terminal s of the second voltage comparator means 5 and the terminal t of the N-MOST 55 constituting the switching means 7.

The terminal p of the N-MOST 55 constituting the switching means 7, the power supply terminal k of the second voltage comparator means 5 and the first control terminal n serving as the inversion input terminal of the comparator 53, and the power supply terminal m of the clock output means 6 are connected to the anode terminal of the reverseblocking diode 8 shown in FIG. 1.

An output terminal of the comparator 53 constituting the second voltage comparator means 5 is connected to an input terminal of the inverter 54 and an output terminal xo of the inverter 54 is connected to the control terminal xi of the N-MOST 55 constituting the switching means 7.

The operation of the booster means 2 of the electronic watch shown in FIG. 2 will be now described with reference to FIGS. 5 to 8.

Figure 5:
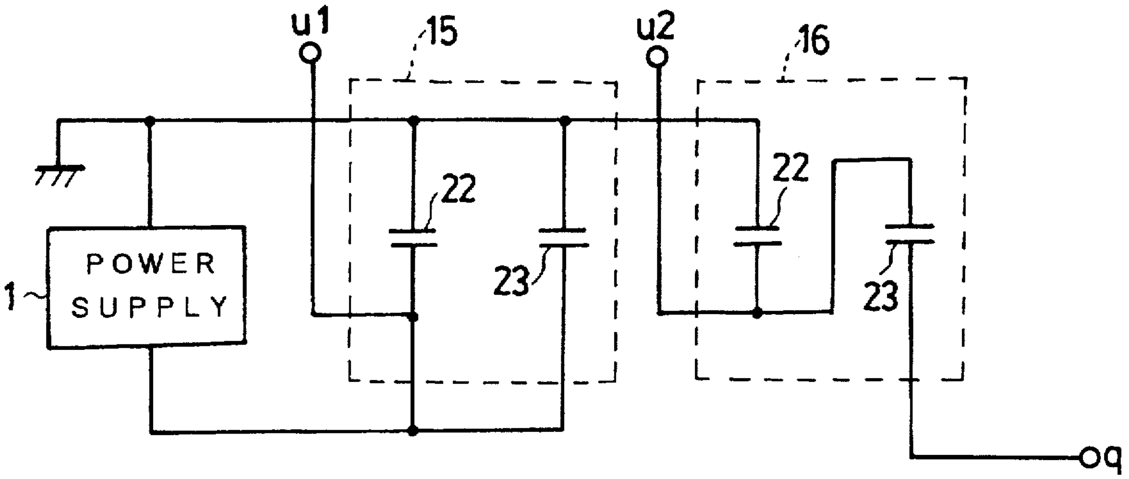
FIG. 5 is a view for explaining the operation of the booster means 2 shown in FIG. 2 wherein a first booster circuit 15 of the booster means 2 is in a charging state, and a second booster circuit 16 is in a discharging state.

FIG. 5 is a view for explaining the operation of charging the capacitor (condenser) of the first booster circuit 15 and the operation of storing the voltage charged in the capacitor (condenser) of the second booster circuit 16 in the storage means 3.

Figure 6:
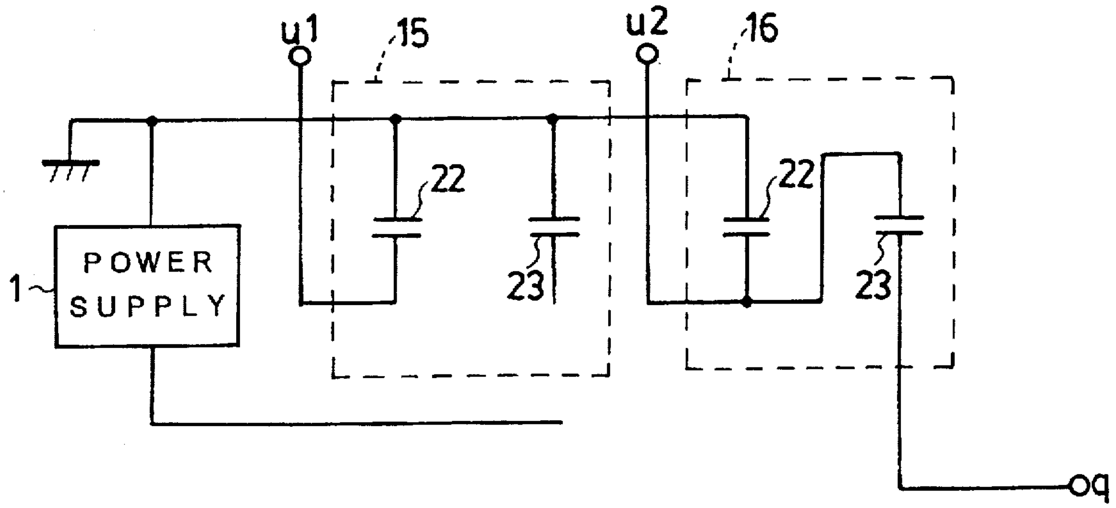
FIG. 6 is a view for explaining the operation of the booster means 2 wherein a voltage of a first capacitor 22 of the first booster circuit 15 is sampled.

FIG. 6 is a view for explaining the operation of sampling the voltage of the first capacitor 22 of the first booster circuit 15 from the state in FIG. 5.

Figure 7:
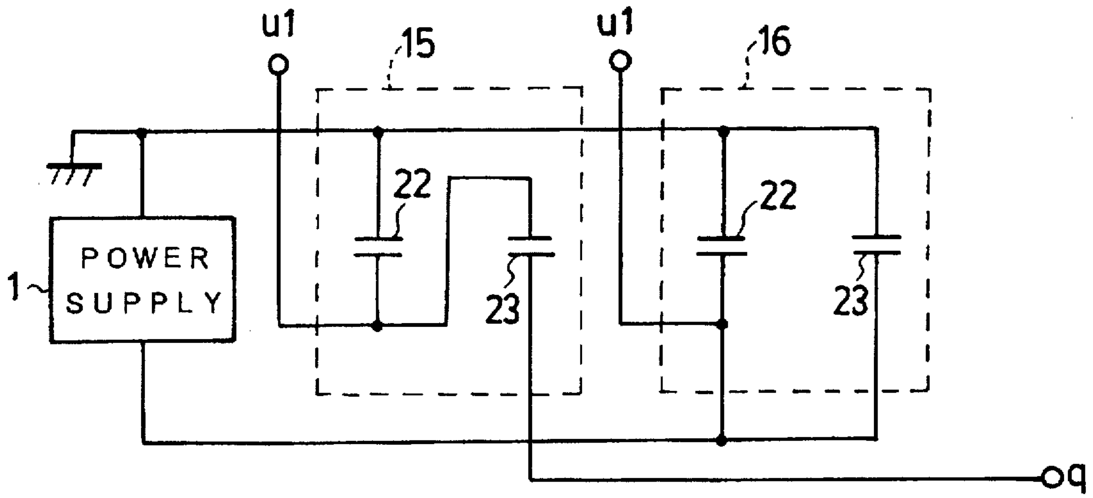
FIG. 7 is a view for explaining the operation of the booster means 2 wherein the second booster circuit 16 is in a charging state and the first booster circuit 15 is in a discharging state.

FIG. 7 is a view for explaining the operation of charging the second booster circuit 16 and the operation of storing the voltage charged in the capacitor (condenser) of the first booster circuit 15 in the storage means 3.

Figure 8:
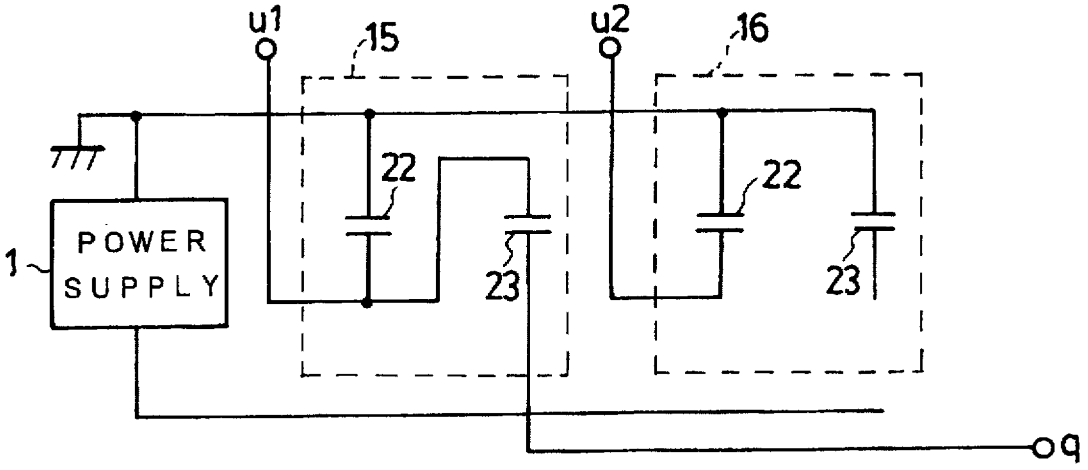
FIG. 8 is a view for explaining the operation of the booster means 2 wherein the voltage of the first capacitor 22 of the second booster circuit 16 is sampled.

FIG. 8 is a view for explaining the operation of sampling the voltage of the first capacitor 22 of the second booster circuit 16.

Figure 9:
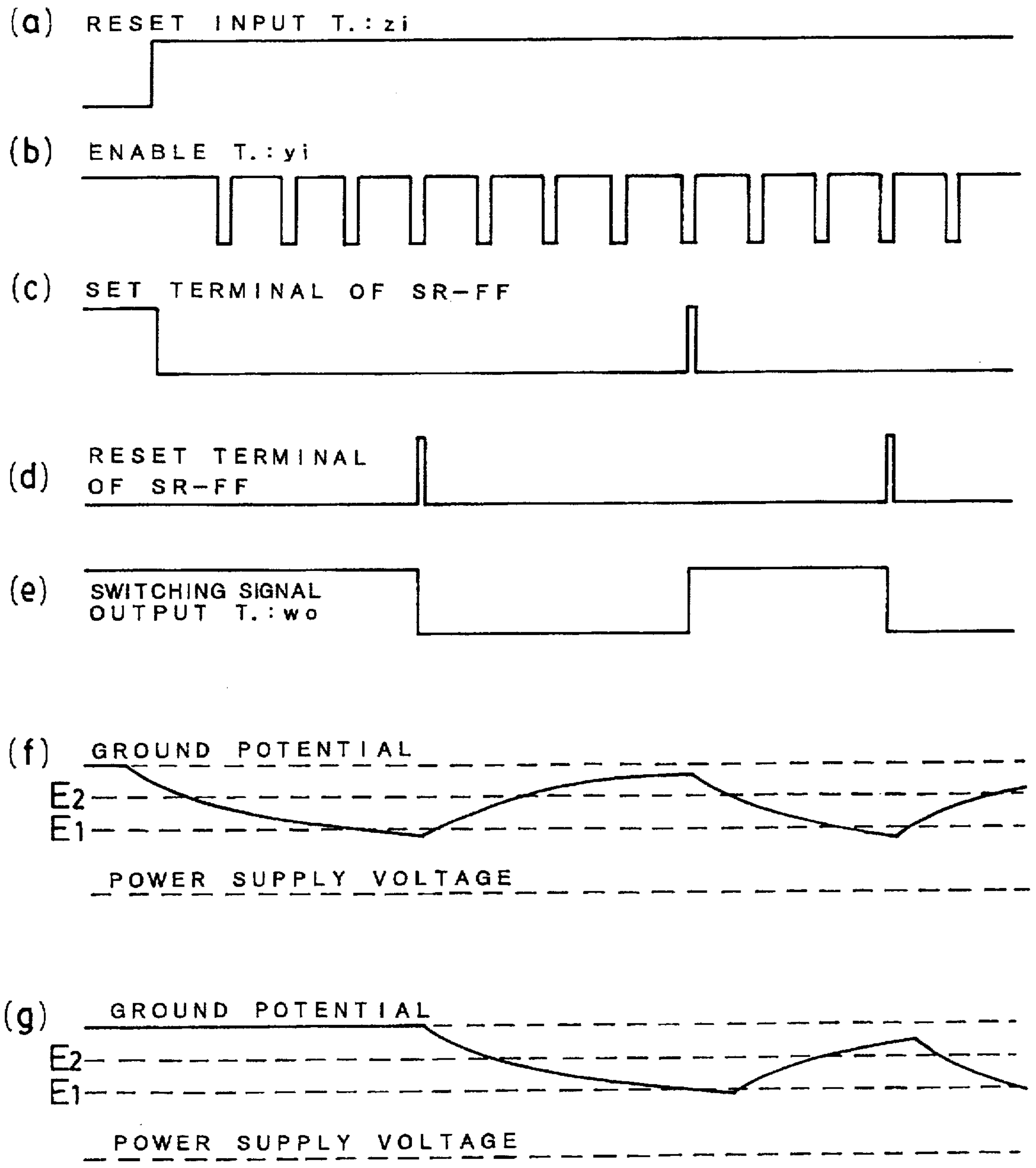
FIG. 9 are waveforms of each signal inputted in and outputted from each terminal of the first voltage comparator means 4 in FIG. 3.

FIG. 9 are waveforms showing input/output waveforms of signals issued by each terminal of the first voltage comparator means 4 shown in FIG. 3.

The operation of the electronic watch according to the first embodiment will be now described with reference to FIGS. 5 to 9.

When there occurs a temperature difference between the hot pole and the cold pole of the electrothermic type generator of the power supply 1, a voltage is generated. Thus generated voltage of about −1 to −2 V is applied to the booster means 2, the cathode terminal of the reverseblocking diode 8 and the reference power supply terminal i of the first voltage comparator means 4.

The anode terminal of the reverse-blocking diode 8 immediately before the voltage is generated was the ground potential which is substantially the same as the high potential side terminal a of the power supply 1. However, when the voltage of about −1 to −2 V is applied to the cathode terminal of the reverse-blocking diode 8, the reverse-blocking diode 8 is forwardly biased to be conductive so that the voltage which is substantially the same as the cathode terminal is generated in the anode terminal.

Accordingly, the voltage of about −1 to −2 V is applied to each terminal j, k, and m of the first voltage comparator means 4, the second voltage comparator means 5, and the clock output means 6 and the first control terminal n of the second voltage comparator means 5 (inversion input terminal of the comparator 53 shown in FIG. 4).

At this time, the booster means 2 is not operated, and hence each voltage appealing on the power supply terminal (hereinafter referred to as simply the voltage of the power supply terminal) r of the storage means 3, the second control terminal s of the second voltage comparator means 5 (non-inversion terminal of the comparator 53 shown in FIG. 4), and the terminal t of the switching means 7 connected to the booster output terminal q of the booster means 2 holds the ground potential (high level) which is the same as the high potential side terminal a of the power supply 1.

Accordingly, the output terminal of the comparator 53 shown in FIG. 4 constituting the second voltage comparator means 5 goes high level "H" (hereinafter referred to as simply "H") while the output terminal xo of the inverter 54 goes low level "L" (hereinafter referred to as simply "L"), thereby permuting the N-MOST 55 of the switching means 7 to be OFF.

When the power supply terminal m of the clock output means 6 becomes about −1 to −2 V, the clock system 51 shown in FIG. 4 starts its operation. At this time, the clock system 51 outputs the "L" signal to the power-on reset terminal zo immediately after the minus voltage is applied to the power supply terminal m, and also outputs the "H" signal to the sampling signal output terminal yo.

5 The P-MOST 47 of the reference voltage generating circuit 11 in FIG. 3 constituting the first voltage comparator means 4 is OFF since the "H" signal from the sampling signal output terminal yo is applied to the enable terminal connected to the control terminal thereof immediately after the minus voltage is generated by the power supply 1. Accordingly, the reference voltage Vr of the reference voltage generating circuit 11 becomes the power-supply voltage of −1 to −2 V to be applied to the reference power supply terminal i, which is outputted to each non-inversion input terminal of the first and second comparators 40 and 41 of the voltage comparator circuit 12.

The first and second capacitance output terminals u1 and u2 shown in FIG. 2 hold substantially the ground potential (high level) immediately after the minus voltage is generated. Accordingly, since the first and second comparator terminals v1 and v2 shown in FIG. 3 respectively become high level "H" (hereinafter referred to as "become "H""), each non-inversion input terminal of the first and second comparators 40 and 41 in the voltage comparator circuit 12 becomes "H".

Accordingly, the output terminal of the inverter 43 outputs the "L" signal to the reset terminal R of the SR-FF 44. One input terminal of the two-input NAND circuit 49 connected to the output terminal of the buffer 42 holds "H". Further, the signal from the power-on reset terminal zo of the clock output means 6 is applied to the reset input terminal zi connected to the other input terminal of the two-input NAND circuit 49. Accordingly, the "H" signal from the output terminal of the two-input NAND circuit 49 is outputted to the set terminal S of the SR-FF 44 while the signal from the power-on reset terminal zo keeps "L". As a result, the output terminal of the SR-FF 44, namely, the switching signal output terminal wo outputs the "H", thereby determining an initialization.

Detailed operations of the booster means 2 and the first voltage comparator means 4 will be now described hereinafter.

In the booster means 2 shown in FIG. 2, the pulse terminal yp and the switching terminal wi of the control circuit 17 become "H" when the booster means 2 is initialized. Accordingly, the first and second N-MOSTs 26 and 27 are ON, and the third and fourth N-MOSTs 28 and 35 are OFF and the P-MOST 29 is ON wherein these elements constitute the first booster circuit 15.

Whereupon the first and second N-MOSTs 26 and 27 are OFF, the third and fourth N-MOSTs 28 and 35 are ON, and the P-MOST 29 is OFF, wherein these elements constitute the second booster circuit 16.

FIG. 5 shows a connecting condition of the capacitors 22 and 23 in the first and second booster circuits 15 and 16 at this time.

That is, the first and second capacitors 22 and 23 constituting the first booster circuit 15 are connected in parallel to the power supply 1 to carry out charging. The first and second capacitors 22 and 23 constituting the second booster circuit 16 are connected in series to each other so as to output a minus voltage obtained by summing up the charged voltage of the first and second capacitors 22 and 23 to the booster output terminal q and storing the charge in the charging capacitor 52 of the storage means 3 shown in FIG. 4 to charge the storage means 3.

At this time, the enable terminal yi of the first voltage comparator means 4 shown in FIG. 3 holds "H" while the reference voltage Vr of the reference voltage generating circuit 11 holds "L" owing to the minus voltage to be applied to the reference power supply terminal i. Accordingly, even if the voltage levels of the non-inversion input terminals of the first and second comparators 40 and 41 are slightly varied or the reset input terminal zi goes "H" from "L", the output terminal (switching signal output terminal wo) of the SR-FF 44 holds "H".

Successively, when the sampling signal output terminal yo of the clock output means 6 outputs an "L" pulse, the pulse terminal yp of the booster means 2 shown in FIG. 2 and the enable terminal yi of the first voltage comparator means 4 shown in FIG. 3 go "L".

The switching terminal wi of the control circuit 17 shown in FIG. 2 holds "H", and the pulse terminal yp goes "L". Accordingly, the first, second, third and fourth N-MOSTs 26, 27, 28 and 35 are OFF, and the P-MOST 29 is ON wherein these elements constitute the first booster circuit 15.

Further, the first and second N-MOSTs 26 and 27 are OFF, and the third and fourth N-MOSTs 28 and 35 are ON, and the P-MOST 29 is OFF wherein these elements constitute the second booster circuit 16.

As a result, the connecting condition of the first and second capacitors 22 and 23 in the first and second booster circuits 15 and 16 is illustrated in FIG. 6, wherein the voltage of the first capacitor 22 constituting the first booster circuit 15 is taken from the first capacitance output terminal ul and is sampled.

At this time, the first and second capacitors 22 and 23 constituting the first booster circuit 15 are separated from the lower potential side of the power supply 1; this is in a charging interruption state. Further, the first and second capacitors 22 and 23 constituting the second booster circuit 16 are connected in series between the booster output terminal q and the ground, and keep in a discharging state while the charge is stored in the charging capacitor 52 of the storage means 3.

At this time, since the enable terminal yi shown in FIG. 3 goes "L" upon reception of the "L" pulse from the sampling signal output terminal yo of the clock output means 6, the P-MOST 47 of the reference voltage generating circuit 11 is ON. Accordingly, the set reference voltage Vr is inputted to each inversion input terminal of the first and second comparators 40 and 41. The first comparator 40 compares the voltage level from the first comparator terminal v1 to be inputted to the non-inversion input terminal of the first comparator 40 with the reference voltage Vr, while the second comparator 41 compares the voltage level from the second comparator terminal v2 with the reference voltage Vr.

At this time, the non-inversion input terminal of the first comparator 40 substantially becomes ground level. As a result, the non-inversion input terminal of the first comparator 40 is higher than the reference voltage Vr (minus voltage) inputted to the inversion input terminal, so the output terminal of the first comparator 40 goes "H", which permits the set terminal S of the SR-FF 44 to be "L".

The charged voltage of the first capacitor 22 in the first booster circuit 15 to be inputted to the first comparator terminal v1 from the first capacitance output terminal u1 in FIG. 6 is inputted to the non-inversion input terminal of the second comparator 41. The second comparator 41 compares the inputted charge voltage with the reference voltage Vr to be inputted to the inversion input terminal, and permits the voltage of the output terminal to be "L" when the charge voltage is lower than the reference voltage Vr, which permits the reset terminal of the SR-FF 44 to be "H". As a result, the SR-FF 44 is reset so as to permit the voltage of the switching signal output terminal wo serving as the output terminal thereof to be "L".

When the switching signal output terminal wo goes "L", the switching terminal wi of the control circuit 17 shown in FIG. 2 goes "L". When the pulse terminal yp is "H", the first and second N-MOSTs 26 and 27 are OFF, the third and fourth N-MOSTs 28 and 35 are ON and the P-MOST 29 is OFF, wherein these elements constitute the first booster circuit 15.

Further, the first and second N-MOSTs 26 and 27 are ON, the third and fourth N-MOSTs 28 and 35 are OFF and the P-MOST 29 is ON, wherein these elements constitute the second booster circuit 16.

At this time, a connecting condition of each of the first and second capacitors 22 and 23 of the first and second booster circuits 15 and 16 is illustrated in FIG. 6, wherein the first and second capacitors 22 and 23 constituting the second booster circuit 16 are connected in parallel to the power supply 1 to thereby carry out the charging, while the first and second capacitors 22 and 23 constituting the first booster circuit 15 are connected in series between the booster output terminal q and the ground, and keep in a discharging state while the charge is stored in the charging capacitor 52 of the storage means 3.

At this time, the enable terminal yi shown in FIG. 3 holds "H", and the reference voltage Vr outputted by the reference voltage generating circuit 11 holds "L". Accordingly, even if the voltage levels of the non-inversion input terminals of the first and second comparators 40 and 41 are slightly varied, the output terminal of the SR-FF 44 holds "L".

Successively, when the clock output means 6 outputs the "L" pulse for sampling from the sampling signal output terminal yo, the pulse terminal yp shown in FIG. 2 and the enable terminal yi shown in FIG. 3 go "L".

Accordingly, the switching terminal wi in the control circuit 17 shown in FIG. 2 goes "L", and the pulse terminal yp also goes "L". Accordingly, the first and second N-MOSTs 26 and 27 and the third and fourth N-MOSTs 28 and 35 are OFF, and the P-MOST 29 is ON wherein these elements constitute the second booster circuit 16.

Further, the first and second N-MOSTs 26 and 27 are OFF and the third and fourth N-MOSTs 28 and 35 are ON, and the P-MOST 29 is OFF wherein these elements constitute the first booster circuit 15.

Accordingly, the connecting condition of the first and second capacitors 22 and 23 in the first and second booster circuits 15 and 16 are illustrated in FIG. 8, wherein the voltage of the first capacitor 22 constituting the second booster circuit 16 is taken from the second capacitance output terminal u2 and is sampled.

At this time, the first and second capacitors 22 and 23 constituting the second booster circuit 16 are separated from the lower potential side of the power supply 1; this is in a charging interruption condition. Further, the first and second capacitors 22 and 23 constituting the first booster circuit 15 are connected in series between the booster output terminal q and the ground, and keep in a discharging state while the charge is stored in the charging capacitor 52 of the storage means 3.

At this time, the enable terminal yi shown in FIG. 3 goes "L", and the P-MOST 47 of the reference voltage generating circuit 11 is ON. Accordingly, the set reference voltage Vr is generated and is inputted to the inversion input terminal of the first and second comparators 40 and 41. The first and second comparators 40 and 41 compares the voltage levels of the first and second comparator terminals v1 and v2 with the thus generated reference voltage Vr.

At this time, the non-inversion input terminal of the second comparator 41 is higher than the reference voltage Vr (minus voltage) to be inputted to the inversion input terminal of the second comparator 41. Accordingly, the output terminal of the second comparator 41 goes "H", which permits the reset terminal R of the SR-FF 44 to be "L".

At this time, the non-inversion input terminal of the first comparator 40 receives the charge voltage of the first capacitor 22 constituting the second booster circuit 16 from the second capacitance output terminal u2 shown in FIG. 8. The level of the charge voltage is compared with the reference voltage Vr inputted into the inversion input terminal of the first comparator 40. When the charge voltage is lower than the reference voltage Vr, the output terminal of the first comparator 40 goes "L". This output permits the set terminal S of the SR-FF 44 to be "H" so as to set the SR-FF 44, and also permits the output terminal thereof, i.e., the voltage of the switching signal output terminal wo to be "H".

As set forth in detail above, the charge voltages of the first capacitors 22 constituting the first and second booster circuits 15 and 16 shown in FIG. 2 are detected by the first voltage comparator means 4 shown in FIG. 3. When the first and second booster circuits 15 and 16 are alternately repeatedly switched to a charging state or discharging state, the charged voltage of the storage means 3 shown in FIG. 4 is substantially kept constant.

The non-inversion input terminal (second control terminal s) of the comparator 53 constituting the second voltage comparator means 5 shown in FIG. 4 is connected to the booster output terminal q of the booster means 2 shown in FIG. 2. When the voltage of the booster output terminal q is lower than the voltage of the inversion input terminal of the comparator 53 (minus voltage to be applied from the power supply 1 by way of the reverse-blocking diode 8), the output terminal of the comparator 53 goes "L", and the "H" signal which is inverted by the inverter 54 is applied to the control terminal of the N-MOST 55 in the switching means 7 through the output terminal xo, thereby permitting the N-MOST 55 to be ON.

Accordingly, the charge voltage in the storage means 3 is applied to the clock output means 6 so that the clock system 51 constituting the clock output means 6 can be driven.

If the storage means 3 is further charged, the reverse-blocking diode 8 is reversely biased to cut off the voltage. Accordingly, the power supply terminal m of the clock output means 6 is electrically separated from the lower potential side terminal g of the power supply 1 so that driving energy of the clock output means 6 is fully supplied from the storage means 3.

FIGS. 9(*a*) to 9(*e*) show waveforms of input and output signals issued by each terminal of the first voltage comparator means 4 shown in FIG. 3. FIG. 9(*f*) shows a voltage waveform of the first comparator terminal v1 of the first voltage comparator means 4 shown in FIG. 3 representing the voltage of the first capacitance output terminal u1 shown in FIG. 2. FIG. 9(*g*) shows a voltage waveform of the second comparator terminal v2 shown in FIG. 3 representing the voltage of the second capacitance output terminal u2 shown in FIG. 2.

Figure 22:
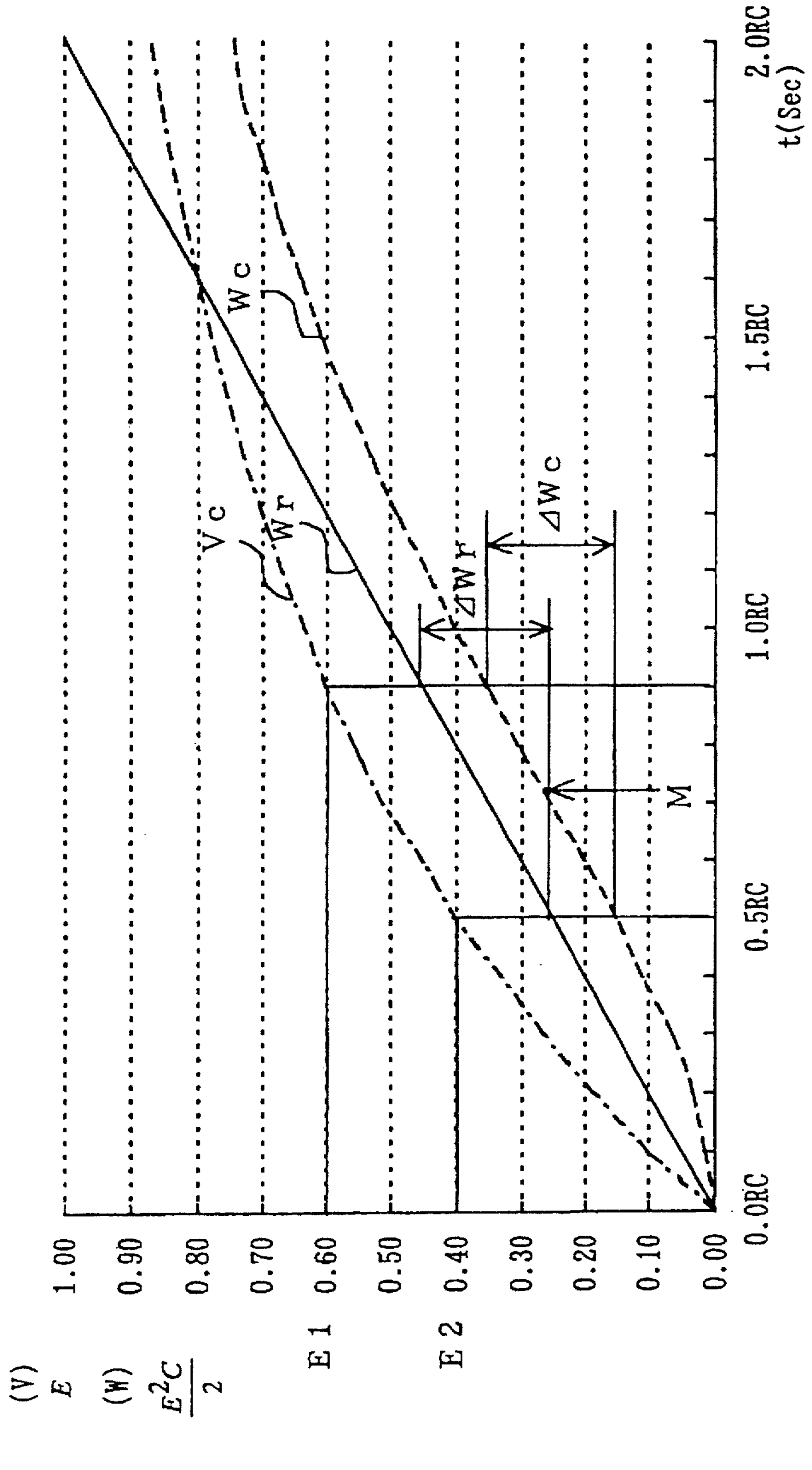
FIG. 22 is a graph for explaining charging efficiency of a charging circuit of a conventional and the present electronic watch.
Figure 23:
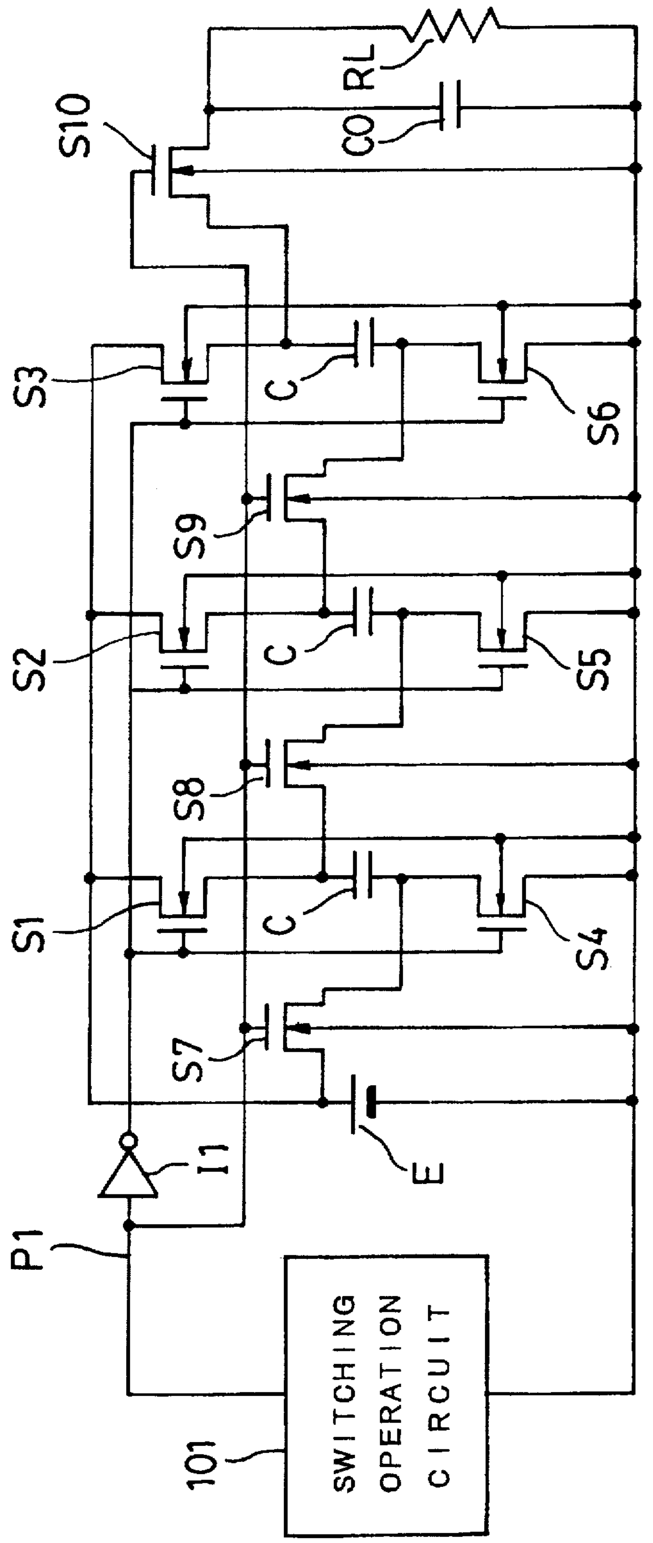
FIG. 23 PRIOR ART
FIG. 23 is a circuit diagram showing an arrangement of a booster circuit employed by the conventional electronic watches.
Figure 24:
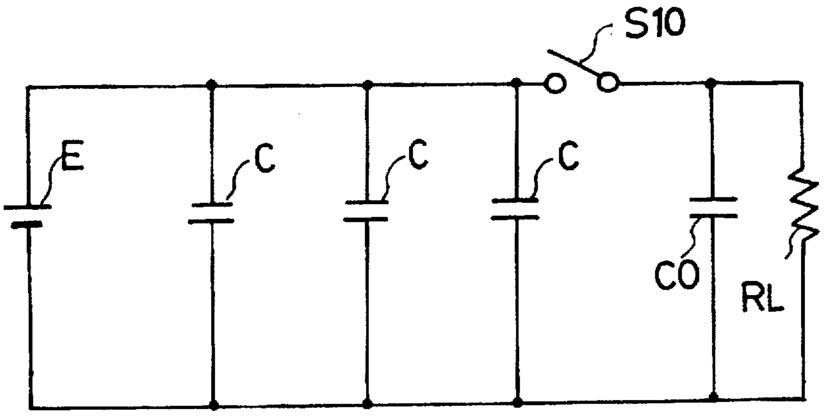
FIG. 24 PRIOR ART
FIG. 24 is an equivalent circuit diagram showing a state where a charge is stored in each capacitor of the booster circuit shown in FIG. 23.
Figure 25:
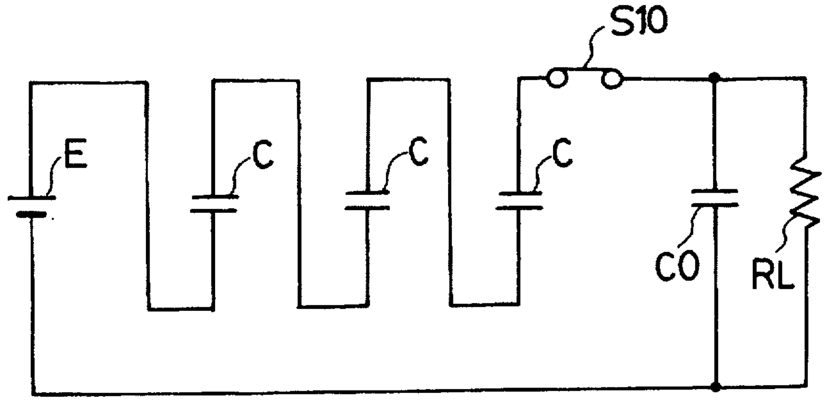
FIG. 25 PRIOR ART
FIG. 25 is an equivalent circuit diagram showing a state where a charge which is stored in each capacitor of the booster circuit shown in FIG. 23 is stored in a booster output capacitor.

Potential E1 and E2 in FIG. 9(*f*) and FIG. 9(*g*) show potentials for taking out effective power at a portion adjacent to a point M where the charging characteristics curve of the capacitor is changing as shown in FIG. 22 (hereinafter referred to as a transition point M). The waveforms shown in FIG. 9 are those obtained by setting the reference voltage Vr of the reference voltage generating circuit 11 shown in FIG. 3 to the potential E1.

The advantage of a method of charging the booster means and the storing means of the electronic watch according to the first embodiment will be now described with reference to FIG. 22.

A manner of charging the first and second capacitors 22 and 23 constituting the first and second booster circuits 15 and 16 shown in FIG. 2 is first explained with reference to FIG. 22.

As is well known, when the load resistor RL which has the same value as the internal resistance value R of the power supply is connected to the power supply with the voltage E, the circuit arrangement is balanced, and the maximum power can be taken out from the load. A power Wr at this time is expressed as follows.

$$Wr=(E^2/R)t$$

In FIG. 22, the variation of the power Wr with respect to the charging time is shown by the solid line.

When the capacitor load having the capacitance value C is connected instead of the resistor R, the charged current Ic is expressed as follows.

$$Ic=(E/R)\exp(-t/RC)$$

The charged voltage Vc is expressed as follows.

$$Vc=E\{1-\exp(-t/RC)\}$$

In FIG. 22, the variation of the charged voltage Vc with respect to the charging time is shown by the dot chain line. The power Wc stored in the capacitor is expressed as follows using the value of the charge current Ic and the charged voltage Vc.

$$Wc=\int Vc\,Ic\,dt=(E^2C/2)\{1-\exp(-t/RC)\}$$

In FIG. 22, the variation of the power Wc with respect to the charging time is shown by the broken line.

As is evident from FIG. 22, it is possible to take out the power expressed by $Wr=E^2C/2$ from the load resistor RL which is balanced with the power supply upon elapse of the time expressed by t=2RC seconds after the load is connected to the power supply, and a power having a value of about 75% of the power Wr can be taken from a capacitor having the capacitance value C but not having an initialize charge.

Further, the power taken from the load resistor RL is expressed by $Wr=E^2C$ which is two times the power Wr upon elapse of the time expressed by t=2RC seconds, but the power Wc taken from the capacitor load C is close to the value expressed by $E^2C/2$ and this is merely fifty percent of the power Wr taken from the load resistor RL.

Accordingly, if a plurality of capacitors are employed and the charging time is less than the time t=2RC as mentioned in the first embodiment, wherein other capacitors are charged while the power in the charged capacity is transferred to the storage means, it is possible to do this power with about 75% efficiency.

Still further, the power curve Wc of the capacitor has the transition point M at $t\approx 0.76RC$. At this time, the power Wc represented by a curve has the same inclination as the power Wr represented by a straight line, and hence if the charging and discharging are repeated at or near the transition point M, the power can be effectively taken out.

Suppose that the capacitor is initially charged, and charging starts from the potential E2 and ends at the potential E1. Since the increased amount ΔWr of the power of the load resistor is substantially the same as that of ΔWc of the power in the capacitor load, it is possible to take out the power which is substantially the same as that of the load resistor balanced with the power supply.

The storage means 3 in the first embodiment may employ an electric double layer capacitor (condenser having a large capacitance). It is also possible to employ re-chargeable means such as a secondary cell or battery. When the secondary battery is employed as the storage means, the voltage of the secondary battery shows a constant value even if it is continuously charged. Accordingly, the potential E2 of the first and second capacitors 22 and 23 is set to be slightly higher than the voltage of the secondary battery when the first and second capacitors 22 and 23 of the first booster circuit 15 of the booster means 2 are connected in series to each other, and the value of the potential E2 is detected to switch between the first booster circuit 15 and the second booster circuit 16 for carrying out the charging.

When an electric double layer capacitor is employed, the voltage is increased as the charging progresses, and hence the potential E2 is also increased. As a result, the potential E1 is detected to switch between the first booster circuit 15 and the second booster circuit 16.

In the first embodiment, the potential E1 is set to be about 60% of the power-supply voltage shown in FIGS. 9(*f*) and 9(*g*). However, when the charge voltage of the storage means 3 is increased, the potential E1 may be increased as the charge voltage of the storage means is increased. Alternately, the potential E1 may be set to be higher in advance.

Although the charge voltage is used for controlling the booster circuits in the first embodiment, the booster circuits may be controlled by the charging time. If the internal resistance of the power supply is known in advance, two sets of the booster circuits may be switched to each other by a control circuit so that the charging time will be set to be 2RC or less.

Further, two booster circuits are employed as the booster means in the first embodiment whereby the charging by the power-supply voltage and the charging of the storage means by the charge voltage are alternately performed. However, it is needless to say that the invention also works when three or more booster circuits are employed wherein the capacitance values of the first and second capacitors constituting the booster circuits are made larger than those of the first embodiment, and these booster circuits are sequentially switched to each other, whereby one booster circuit charges the storage means and other booster circuits are charged by the power-supply voltage.

Second Embodiment (FIGS. 10 to 20)

An electronic watch and a method of driving the electronic watch according to a second embodiment of the invention will be now described with reference to FIGS. 10 to 20.

Figure 10:
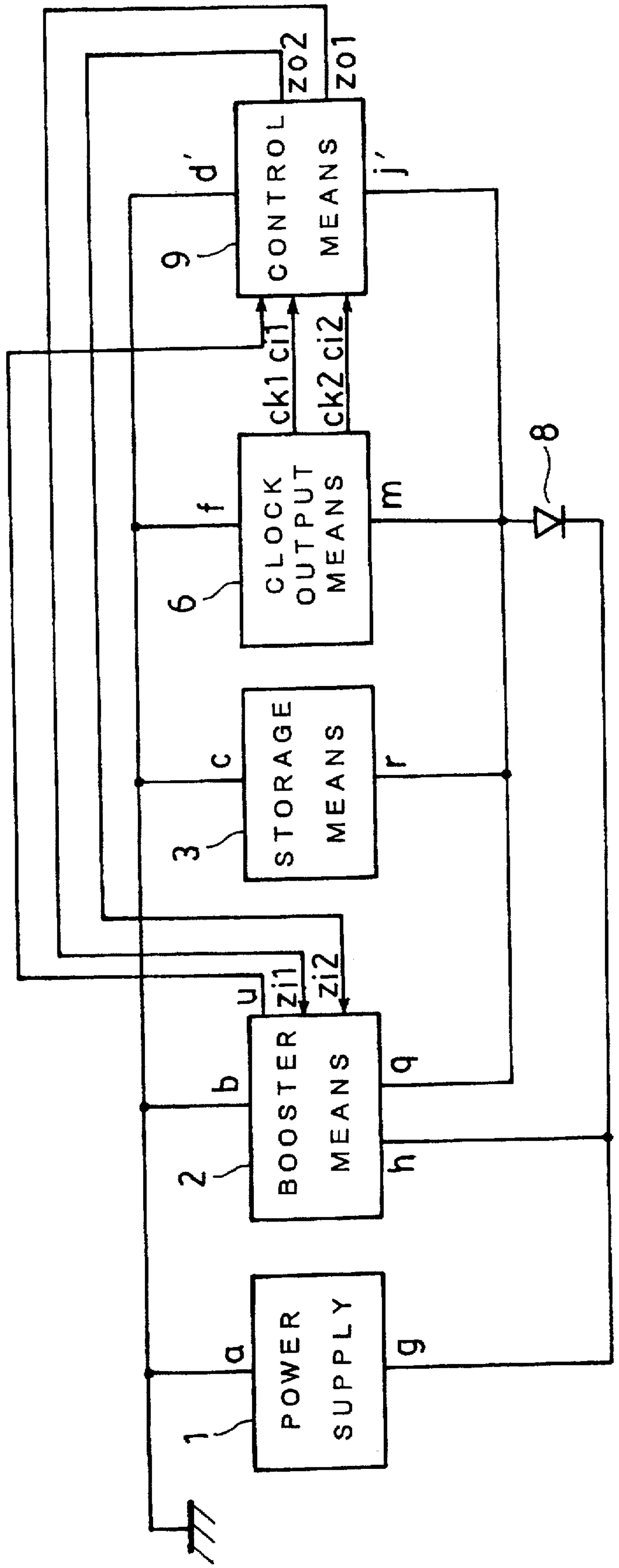
FIG. 10 is a block diagram showing a circuit arrangement of an electronic watch according to a second embodiment of the invention.

FIG. 10 is a block diagram showing a circuit arrangement of the electronic watch according to the second embodiment of the invention. Elements corresponding to those in the first embodiments are denoted by the same numerals.

The electronic watch comprises the power supply 1, the booster means 2, the storage means 3, the clock output means 6, a control means 9, and the reverse-blocking diode 8. The arrangement of the electronic watch of the second embodiment is different from that of the first embodiment in that the control means 9 is provided instead of the first voltage comparator means 4 in the first embodiment, and the second voltage comparator means 5 and the switching means 7 are omitted.

The high potential side terminal a of the power supply 1 is grounded and is connected to each ground terminals b, c, f and d' of respectively the booster means 2, the storage means 3, the clock output means 6, the control means 9. The lower potential side terminal g for outputting the power-supply voltage of the power supply 1 is connected to the power supply terminal h of the booster means 2 and the cathode terminal of the reverse-blocking diode 8.

The anode terminal of the reverse-blocking diode 8 is connected to the booster output terminal q of the booster means 2 and each power-supply terminal r, m and j' of the storage means 3, the clock output means 6 and the control means 9.

A capacitance output terminal u of the booster means 2 is connected to a voltage comparator terminal v of the control means 9. First and second clock output terminals ck1 and ck2 of the clock output means 6 are respectively connected to first and second clock input terminals ci1 and ci2 of the control means 9.

Further, first and second booster control output terminals zo1 and zo2 of the control means 9 are respectively connected to first and second booster control input terminals zi1 and zi2 of the booster means 2.

The power supply 1 employed by the second embodiment is the same electrothermic type generator as employed by the first embodiment.

Although the internal arrangement of the clock output means 6 for outputting two clock signals is not illustrated, it generally comprises a crystal watch composed of a crystal oscillation circuit, a frequency divider, a waveform generating circuit, a driving circuit, an electromechanical transducer, gears, and a display mechanism.

The circuit arrangements of each block and element constituting the electronic watch according to the second embodiment will be now described.

Figure 11:
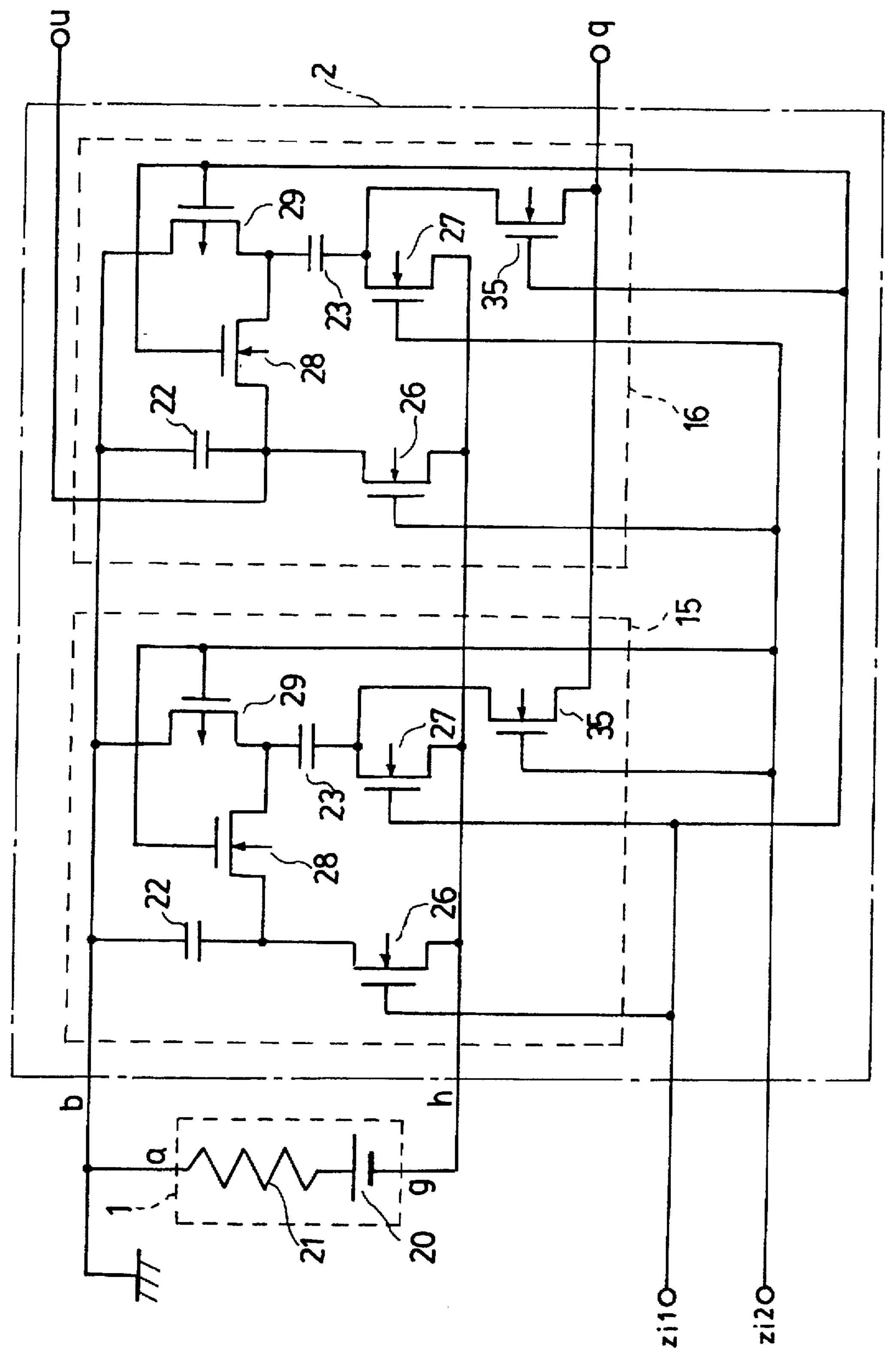
FIG. 11 is a circuit diagram showing internal arrangements of a power supply 1 and a booster means 2 in FIG. 10.

FIG. 11 is a circuit diagram showing the internal arrangements of the power supply 1 and the booster means 2, which are almost similar to those of the power supply 1 and the booster means 2 of the first embodiment shown in FIG. 2, and hence only the internal arrangements which are different from those of the first embodiment are described hereinafter.

In the booster means 2 in FIG. 11, there is no control circuit 17 as provided in the booster means 2 shown in FIG. 2, and the first and second N-MOSTs 26 and 27 and the third and fourth N-MOSTs 28 and 35, respectively of the first and second booster circuits 15 and 16, and the P-MOST 29 are controlled to be ON or OFF by each control signal issued by the first and second booster control output terminal zo1 and zo2 of the control means 9 inputted to the first and second booster control input terminals zi1 and zi2.

Only the capacitance output terminal u is connected to a node between the first capacitor 22 and the first and third N-MOSTs 26 and 28 of the second booster circuit 16 as a capacitor output terminal for sampling the charge voltage of the first capacitor.

The other arrangements of the second embodiment are the same as those of the power supply 1 and the booster means 2 of the first embodiment shown in FIG. 2.

Figure 12:
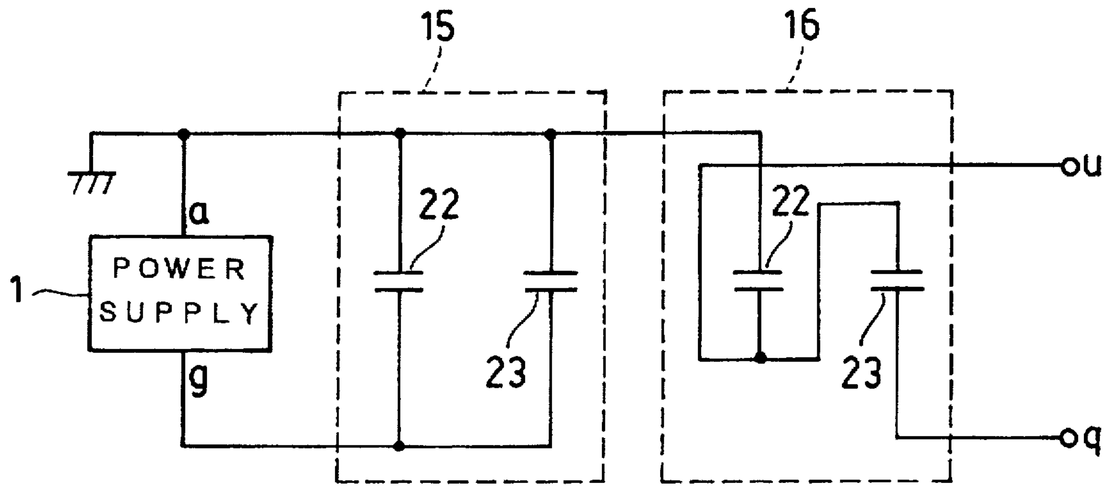
FIG. 12 is a view for explaining the operation of the booster means 2 in FIG. 11 wherein a first booster circuit 15 of the booster means 2 is in a charging state and a second booster circuit 16 is in a discharging state.

FIG. 12 shows a connecting condition of the first and second capacitors 22 and 23 where the first and second capacitors 22 and 23 of the first booster circuit 15 are charged, and the voltage charged in the first and second capacitors 22 and 23 of the second booster circuit 16 is transferred to the storage means 3.

Figure 13:
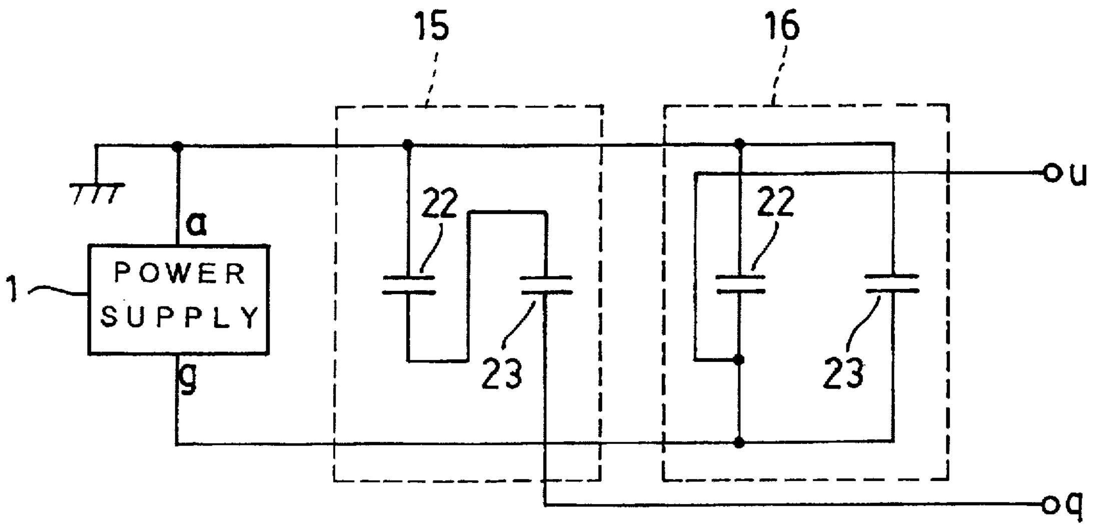
FIG. 13 is a view showing the operation of the booster means 2 wherein the second booster circuit 16 is in a charging state and the first booster circuit 15 is in a discharging state.

FIG. 13 shows a connecting condition of the first and second capacitors 22 and 23 where the first and second capacitors 22 and 23 of the second booster circuit 16 are charged, and the voltage charged in the first and second capacitors 22 and 23 of the first booster circuit 15 is transferred to the storage means 3.

In the booster means 2 in FIG. 12, the first and second capacitors 22 and 23 constituting first booster circuit 15 are connected in parallel to each other between the high potential side terminal (ground terminal) a and the low potential side terminal (power supply terminal) g of the power supply 1, while the first and second capacitors 22 and 23 constituting the second booster circuit 16 are connected in series to each other between the ground and the booster output terminal q.

In the booster means 2 in FIG. 13, the first and second capacitors 22 and 23 constituting second booster circuit 16 are connected in parallel to each other between the high potential side terminal (ground terminal) a and the low potential side terminal (power supply terminal) g of the power supply 1, while the first and second capacitors 22 and 23 constituting the first booster circuit 15 are connected in series to each other between the ground and the booster output terminal q.

Figure 14:
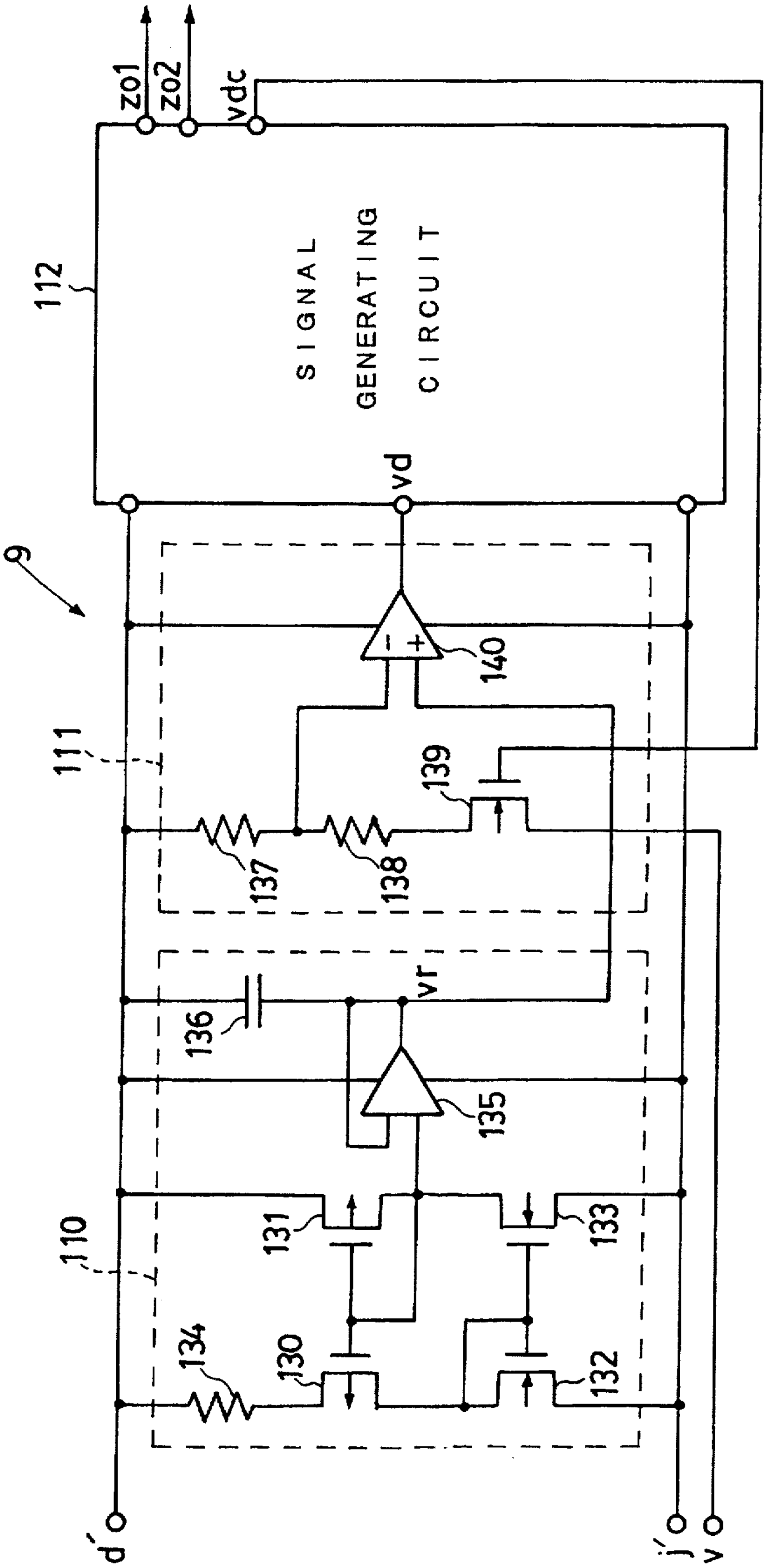
FIG. 14 is a circuit diagram showing an internal arrangement of a control means 9 in FIG. 10.

FIG. 14 is a circuit diagram showing the internal arrangement of the control means 9 of the electronic watch according to the second embodiment of the invention. The control means 9 comprises a reference voltage generating circuit 110, a voltage detecting circuit 111 and a signal generating circuit 112.

The reference voltage generating circuit 110 is a known constant voltage circuit which comprises a resistor 134, two P-MOST 130, P-MOST 131, two P-MOSTs 132 and 133, an operational amplifier 135 and a stable capacitor 136.

The voltage detecting circuit 111 comprises two variable resistors 137 and 138, an N-MOST 139, and a comparator 140.

The signal generating circuit 112 does not show the internal arrangement but it comprises an up/down control circuit, an inhibit circuit, a booster control circuit, a frequency regulator circuit, and a system reset circuit, and a detailed explanation thereof will be given later.

A connecting condition of each element of the reference voltage generating circuit 110 and the voltage detecting circuit 111 will be now described with reference to FIG. 14.

First a connecting condition of the reference voltage generating circuit 110 will be described.

Each one terminal of the P-MOST 131, the resistor 134 and the stable capacitor 136, and a ground terminal of the operational amplifier 135 are connected to the ground terminal d' which is connected to the high potential side terminal a of the power supply 1 shown in FIG. 10.

One terminal of the N-MOSTs 132 and 133 and a power supply terminal of the operational amplifier 135 are connected to the power supply terminal j' which is connected to the booster output terminal q of the booster means 2 shown in FIG. 10.

The other terminal of the resistor 134 is connected to one terminal of the P-MOST 130, while the other terminal of the P-MOST 130 is connected to the other terminal of the N-MOSTs 132 and to the gate terminal of the N-MOSTs 132 and 133.

The other terminal of the N-MOST 133 is connected to the other terminal of the P-MOSTs 131, the gate terminal of the P-MOSTs 130 and 131 and one input terminal of the operational amplifier 135, while the other input terminal of the operational amplifier 135 is connected to an output terminal of the operational amplifier 135 and the other terminal of the stable capacitor 136, wherein the reference voltage Vr outputted from the operational amplifier 135 is inputted to a non-inversion input terminal of the comparator 140 constituting the voltage detecting circuit 111.

The reference voltage Vr of the reference voltage generating circuit 110 is determined by a threshold voltage of the P-MOSTs 131.

Now a connecting condition of the voltage detecting circuit 111 will be described. One terminal of the variable resistor 137 and a ground terminal of the comparator 140 are connected to the ground terminal d' which is connected to the high potential side terminal a of the power supply 1. A power supply terminal of the comparator 140 is connected to the power supply terminal j' which is to be connected to the booster output terminal q of the booster means 2.

One terminal of the N-MOST 139 is connected to the voltage comparator terminal v which is connected to the capacitance output terminal u of the booster means 2 in FIG. 10, while a voltage detection control signal terminal vdc of the signal generating circuit 112 is connected to a gate terminal of the N-MOST 139, and the other terminal of the N-MOST 139 is connected to one terminal of the resistor 138. The other terminal of the resistor 138 is connected to the other terminal of the variable resistor 137 and an inversion input terminal of the comparator 140, while the reference voltage Vr serving as the output of the reference voltage generating circuit 110 is applied to the non-inversion input terminal of the comparator 140. The output terminal of the comparator 140 is connected to the signal generating circuit 112.

Figure 15:
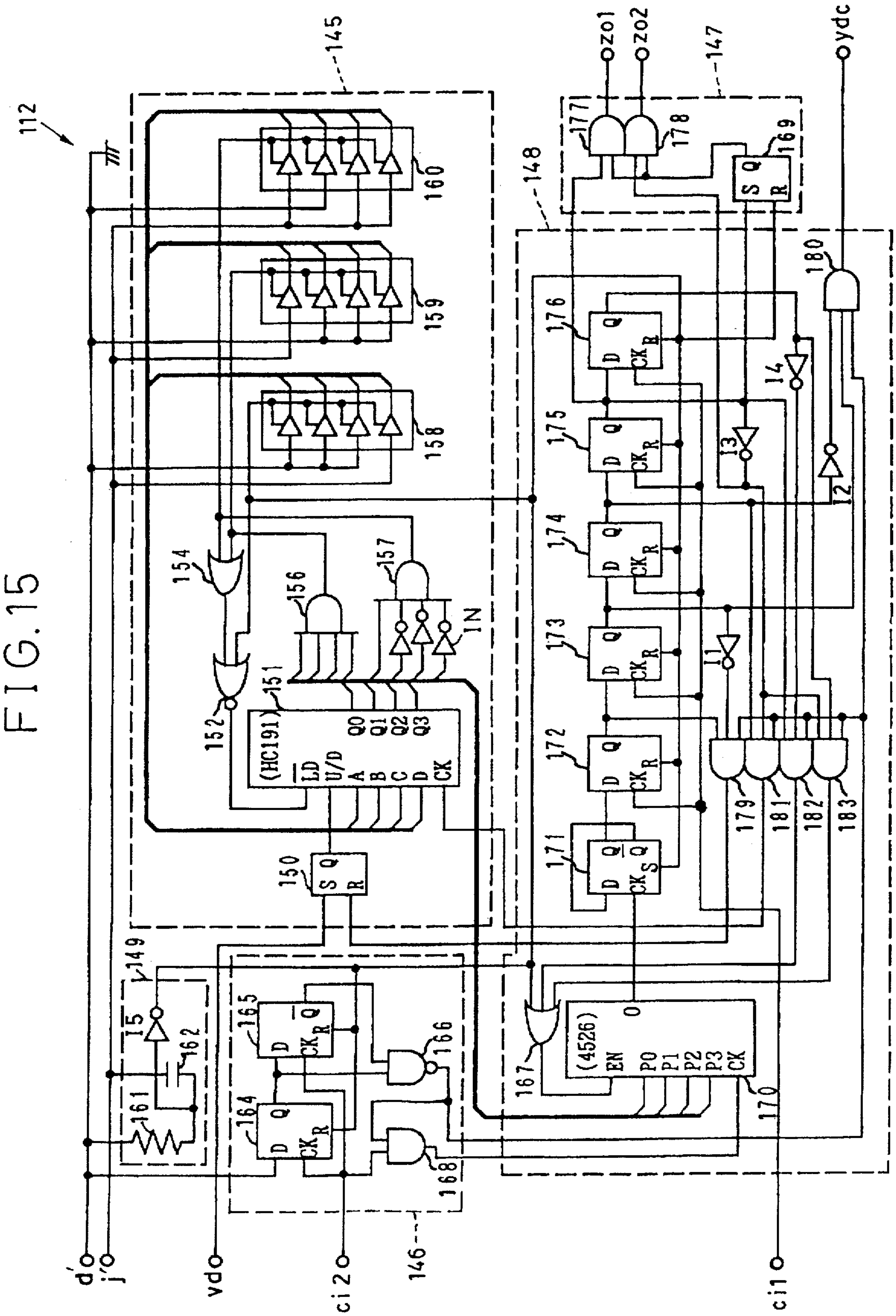
FIG. 15 is a circuit diagram showing an internal arrangement of a signal generating circuit 112 in the control means 9 in FIG. 14.

FIG. 15 is a circuit diagram showing the internal arrangement of the signal generating circuit in the control means 9. The signal generating circuit comprises an up/down control circuit 145, an inhibit circuit 146, a booster control circuit 147, a frequency regulator circuit 148, and a system reset circuit 149.

The up/down control circuit 145 comprises a first SR-FF 150, a binary up/down counter (hereinafter referred to as "up/down counter") 151 which comprises 4 bits and is substantially the same as a 74HC191 that is a general IC, a two input-NOR circuit 152, a two-input OR circuit 154 and a first four-input AND circuit 156. Further, provided are a first, second and third tristate buffer block comprising 4 bits (hereinafter referred to "TBB") 158, 159, and 160, and three inverters INs which are connected to three inputs of a second four-input AND circuit 157.

The inhibit circuit 146 comprises first and second data flip flops (hereinafter referred to as "D-FFs") 164 and 165, a two-input NAND circuit 166, and a two-input AND circuit 168.

The booster control circuit 147 comprises an SR-FF 169, and two-input AND circuits 177 and 178.

The frequency regulator circuit 148 comprises a three-input OR circuit 167, a binary down counter (hereinafter referred to simply as down counter) 170, six D-FFs 171, 172, 173, 174, 175, and 176, five three-input AND circuits 179, 180, 181, 182, and 183 and four inverters I1 to I4.

The system reset circuit 149 comprises a resistor 161, a capacitor 162, and an inverter I5.

A connecting condition of the elements constituting each circuit of the signal generating circuit 112 shown in FIG. 15 will be described now.

One terminal of the resistor 161 constituting the system reset circuit 149 is connected to the ground terminal d' which is connected to the high potential side terminal a of the power supply 1 shown in FIG. 10 and the other terminal of the resistor 161 is connected to one terminal of the capacitor 162, while the other terminal of the capacitor 162 is connected to the power supply terminal j' which is connected to the booster output terminal q of the booster means 2 shown in FIG. 10.

An inverted signal of the system reset signal is outputted from the node between the other terminal of the resistor 161 and one terminal of the capacitor 162. The inverted signal is inverted by the inverter 15, and it is inputted to each reset terminal R of the first and second D-FFs 164 and 165 constituting the inhibit circuit 146, an enable terminal of the first TBB 158 constituting the up/down control circuit 145, first input terminal of the two-input NOR circuit 152, a first input terminal of the three-input OR circuit 167 constituting the frequency regulator circuit 148, a set terminal R of the third D-FF 171, each reset terminal R of the fourth to eighth D-FFs 172, 173, 174, 175, and 176, a reset terminal R of the SR-FF 169 constituting the booster control circuit 147.

A data terminal D of the first D-FF 164 constituting the inhibit circuit 146 is connected to the ground terminal d', and each clock terminal CK of the first and second D-FFs 164 and 165 and a first input terminal of the two-input AND circuit 168 are connected to the second clock input terminal ci2 which receives the second clock signal which is outputted by the clock output means 6 shown in FIG. 10.

An output terminal Q of the first D-FF 164 is connected to a data terminal D of the second D-FF 165 and a first input terminal of the two-input NAND circuit 166, while a second input terminal of the two-input NAND circuit 166 is connected to an inversion output terminal of the second D-FF 165.

An output terminal of the two-input NAND circuit 166 is connected to a second input terminal of the two-input AND circuit 168 and each first input terminal of the first to fifth AND circuits 179, 180, 181, 182 and 183 constituting the frequency regulator circuit 148, and an output terminal of the two-input AND circuit 168 is connected to a clock terminal of the down counter 170 constituting the frequency regulator circuit 148.

A data terminal D of the third D-FF 171 constituting the frequency regulator circuit 148 is connected to its own inversion output terminal, and a clock terminal CK thereof is connected to a zero output of the down counter 170, and an output terminal Q thereof is connected to a data terminal D of the next stage fourth D-FF 172.

Clock terminals CK of the fourth to eighth D-FFs 172, 173, 174, 175 and 176 are connected to the first clock input terminal ci1 which receives the first clock signal outputted by the clock output means 6 shown in FIG. 10.

An output terminal Q of the fourth D-FF 172 is connected to a data terminal of the next stage fifth D-FF 173 and a second input terminal of the AND circuit 179. An output terminal Q of the fifth D-FF 173 is connected to a data terminal D of the next stage sixth D-FF 174, a second input terminal of the second AND circuit 180 and an input terminal of the inverter I1. An output terminal of the inverter I5 is connected to a second input terminal of the AND circuit 179.

An output terminal Q of the sixth D-FF 174 is connected to a data terminal D of the next stage seventh D-FF 175, a second input terminal of the third AND circuit 181, and an input terminal of the inverter I2. An output terminal of the inverter I2 is connected to a third input terminal of the second AND circuit 180.

An output terminal Q of the seventh D-FF 175 is connected to a data terminal D of the next stage eighth D-FF 176, a second input terminal of the fourth AND circuit 182, an input terminal of the inverter I3, a first input terminal of the two-input AND circuit 177 constituting the booster control circuit 147 and a set terminal S of the SR-FF 169. An output terminal of the inverter I3 is connected to a second input terminal of the third AND circuit 181, a third input terminal of the fifth AND circuit 183, and a first input terminal of the AND circuit 178 constituting the booster control circuit 147.

An output of the eighth D-FF 176 is connected to a second input terminal of the AND circuit 183 and an input terminal of the inverter I4, and an output terminal of the inverter I4 is connected to a second input terminal of the AND circuit 182.

An output terminal of the AND circuit 179 is connected to a reset terminal R of the first SR-FF 150 constituting the up/down control circuit 145, and an output of the AND circuit 180 is connected to a gate terminal of the N-MOST 139 constituting the voltage detecting circuit 111 shown in FIG. 14 by way of a voltage detection control terminal Vcd.

An output of the third AND circuit 181 is connected to a clock terminal CK of the up/down counter 151 constituting the up/down control circuit 145, and outputs of the AND circuits 182 and 183 are respectively connected to the second and the third input terminal of the three-input OR circuit 167.

An output of the three-input OR circuit 167 is connected to an enable terminal EN of the down counter 170, data input terminals P0 to P3 of the down counter 170 comprising 4 bits are connected to respectively output terminals Q0 to Q3 of the up/down counter 151 comprising 4 bits, each input terminal of the first four-input AND circuit 156, and input terminals of the second four-input AND circuit 157 whose high order three bit signals are inverted by the inverter IN.

The set terminal S of the first SR-FF 150 constituting the up/down control circuit 145 is connected to the detection signal input terminal Vd which receives the output signal of the comparator 140 serving as the output of the voltage detecting circuit 111 shown in FIG. 14, and an output terminal Q of the first SR-FF 150 is connected to an up/down terminal U/D of the up/down counter 151.

An output terminal of the first four-input AND circuit 156 is connected to a first input terminal of the two-input OR circuit 154, and an enable terminal of the second TBB 159, while an output terminal of the second four-input AND circuit 157 is connected to a second input terminal of the two-input OR circuit 154 and an enable terminal of the third TBB 160.

An output terminal of the two-input OR circuit 154 is connected to a second input terminal of the two-input NOR circuit 152, and an output terminal of the two-input NOR circuit 152 is connected to a load terminal of the up/down counter 151.

The four-bit outputs of the first, second and third TBBs 158, 159 and 160 are connected to one another and also connected to four-bit data terminals A to D of the up/down counter 151.

The first TBB 158 employed here outputs a hexadecimal "7" when "H" signal is inputted to an enable terminal thereof. The second TBB 159 outputs a hexadecimal "E" when the "H" signal is inputted to an enable terminal thereof. The third TBB 160 outputs a hexadecimal "2" when "H" signal is inputted to an enable terminal thereof.

An output of the SR-FF 169 constituting the booster control circuit 147 is connected to each second input terminal of the AND circuits 177 and 178, and an output terminal of the AND circuit 177 is connected to the booster means 2 shown in FIG. 11 by way of the first booster control output terminal zo1, while an output terminal of the AND circuit 178 is connected to the booster means 2 in FIG. 11 by way of the second booster control output terminal zo2.

The second TBB 159 constituting the up/down control circuit 145 is provided to return data in the up/down counter 151 to the hexadecimal "E" so that the value counted by the up/down counter 151 does not overflow when it reaches the high limit hexadecimal "F".

The third TBB 160 constituting the up/down control circuit 145 is provided to return data in the up/down counter 151 to the hexadecimal "2" so that the value counted by the up/down counter 151 does not overflow when it reaches the low limit hexadecimal "1".

The method of driving the electronic watch according to the second embodiment of the invention will be now described with reference to FIGS. 16 to 20.

Figure 16:
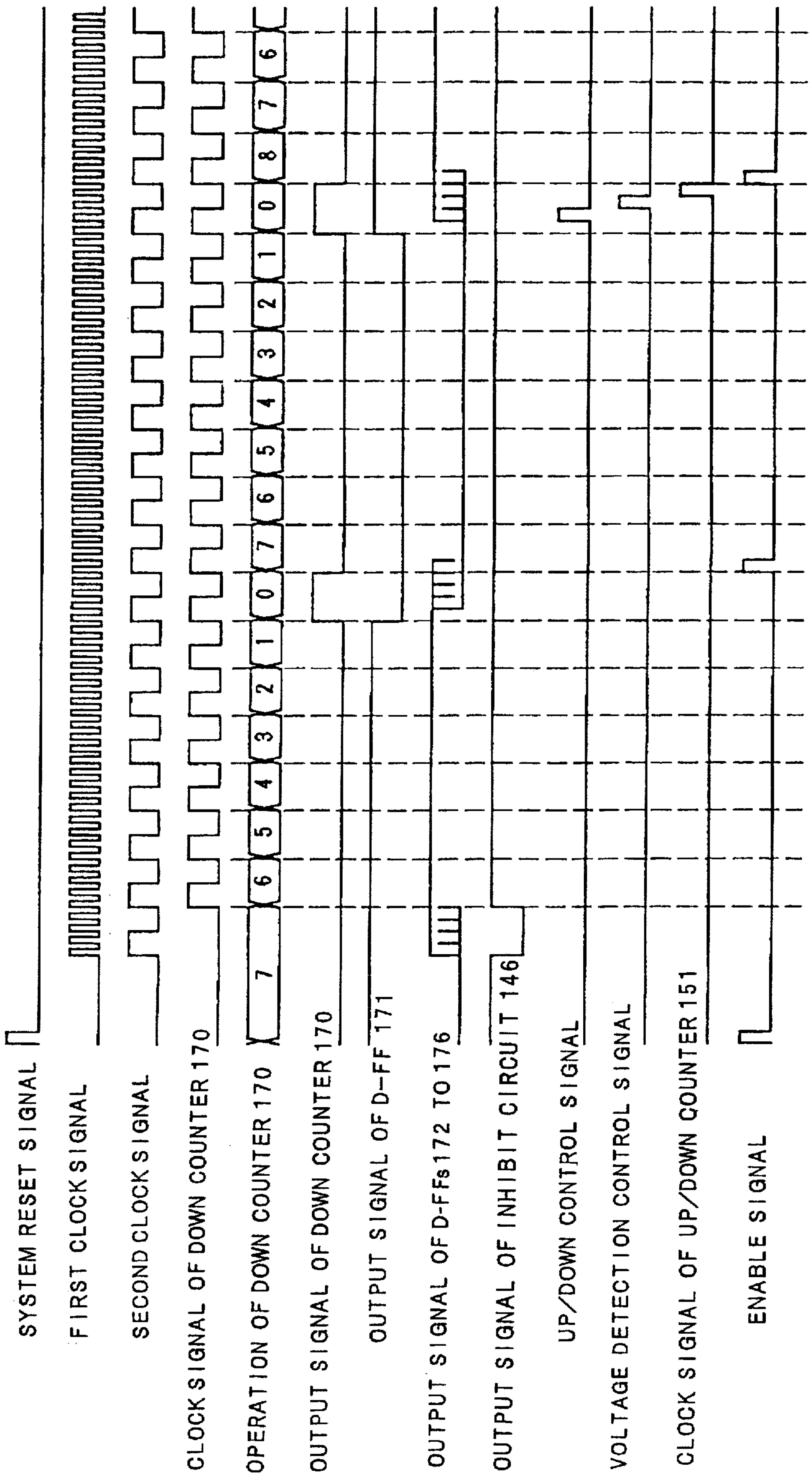
FIG. 16 are waveforms of each signal issued by each element of the control means 9 when the electronic watch in the second embodiment is activated.

FIG. 16 shows waveforms of signals issued by elements of the control means 9 when the electronic watch according to the second embodiment is activated.

When a temperature difference occurs between the hot pole and the cold pole of the electrothermic type generator of the power supply 1 shown in FIG. 14, a voltage is generated, so that the voltage of about −1 to −2 V is applied to the power supply terminal h of the booster means 2 and the cathode terminal of the reverse-blocking diode 8.

The anode terminal of the reverse-blocking diode 8 immediately before the voltage is generated is on the ground potential which is substantially the same as the high potential side terminal a of the power supply 1. However, when the voltage of about −1 to −2 V is applied to the cathode terminal of the reverse-blocking diode 8, the reverse-blocking diode 8 is forwardly biased and is conductive so that the voltage which is substantially the same as the cathode terminal is generated in the anode terminal.

Accordingly, the voltage of about −1 to −2 V is applied to each terminal r, m and j' of the storage means 3, the clock output means 6 and the control means 9. Until then, the first voltage comparator means 4 and the control means 9 are not operating, so that the booster means 2 does not start the boosting operation.

When the voltage of about −1 to −2 V is applied to the power supply terminal m of the clock output means 6, the clock output means 6 starts to operate. When the clock output means 6 operates, it outputs a first clock signal having a relatively high frequency to the first clock output terminal ck1 and a second clock signal having a relatively low frequency to the second clock output terminal ck2 as shown in FIG. 16. In the second embodiment, the first clock signal has four times higher frequency than the second clock signal.

When the voltage of about −1 to −2 V is applied to the power supply terminal j' of the control means 9, the system reset circuit 149 of the signal generating circuit 112 constituting the control means 9 shown in FIG. 15 operates. A system reset signal shown in FIG. 16 is generated before the first and second clock signals are generated.

When the system reset signal is generated, it is supplied to the first and second D-FFs 164 and 165 constituting the inhibit circuit 146, fourth to eighth D-FFs 172, 173, 174, 175 and 176 constituting the frequency regulator circuit 148, and each reset terminal R of the second SR-FF 169 constituting the booster control circuit 147, thereby permitting each output to be "L".

Further, the system reset signal is supplied to the set terminal S of the third D-FF 171 constituting the frequency regulator circuit 148, thereby permitting the output of the third D-FF 171 to be "H".

When the output of the SR-FF 169 constituting the booster control circuit 147 goes "L", first and second booster control output signals (issued by the output terminals zol and zo2) serving as outputs of the two-input AND circuits 177 and 178 respectively go "L".

When the first and second booster control signals go "L", the first booster control input terminals zi1 and zi2 of the booster means 2 respectively go "L", either the first booster circuit 15 or the second booster circuit 16 does not operate. Accordingly, the voltage of about −1 to −2 V generated in the power supply 1 remains outputted to the voltage signal in the booster output terminal q serving as the output of the booster means 2.

Further, the system reset signal is supplied to the enable terminal of the first TBB 158 constituting the up/down control circuit 145 of the signal generating circuit 112 shown in FIG. 15, so that the first TBB 158 outputs a hexadecimal "7" to the four bit data terminal of the up/down counter 151.

At the same time, the system reset signal is supplied to the load terminal of the up/down counter 151 by way of the two-input NOR circuit 152 constituting the up/down control circuit 145, so that the 4-bit output of the up/down counter 151 outputs the hexadecimal "7" to the 4-bit data terminal of the down counter 170 constituting the frequency regulator circuit 148.

Still further, the system reset signal is also supplied to the enable terminal EN of the down counter 170 by way of the three-input OR circuit 167 constituting the frequency regulator circuit 148 so as to preset the down counter 170 to the hexadecimal "7", thereby permitting the output to be "L".

The clock output means 6 outputs the first and second clock signals upon elapse of a given time after the system reset signal is generated.

The first clock signal 143 to be received from the first clock input terminal ci1 is supplied to each clock terminal ck of the fourth to eighth D-FFs 172 to 176 constituting the frequency regulator circuit 148, and the output of the third D-FF 171 holds "H". Accordingly, each output of the fourth to eighth D-FFs 172 to 176 is shifted every cycle of the first clock signal so that it is permitted to be "H", so these D-FFs operate as a shift resistor.

The second clock signal outputted by the clock output means 6 is inputted from the second clock input terminal ci2 shown in FIG. 15, and it is inputted to each clock terminal ck of the first and second D-FFs 164 and 165 constituting the inhibit circuit 146. Thereby, the output of the two-input NAND circuit 166 becomes "L" by one cycle of the second clock signal immediately after the control means 9 is reset by the system reset signal.

Further, the two-input AND circuit 168 constituting the inhibit circuit 146 receives the second clock signal and the output of the two-input NAND circuit 166. Accordingly, a clock signal obtained by deleting the first cycle of the second clock signal as shown in FIG. 16 is outputted to the clock terminal of the down counter 170 constituting the frequency regulator circuit 148 immediately after the control means 9 is reset by the system reset signal.

The first to fourth three-input AND circuits 179 to 182 constituting the frequency regulator circuit 148 receive the outputs of the fourth to seventh D-FFs 172 to 175, the inversion outputs of the fifth to eighth D-FFs 173 to 176, and the output of the two-input NAND circuit 166 constituting the inhibit circuit 146. Accordingly, the "H" signals is issued when the output of the two-input NAND circuit 166 is "H" and the fourth to eighth D-FFs 172 to 176 are "H".

Since the fourth to eighth D-FFs 172 to 176 operate as a shift resistors as set forth above, the first to fourth three-input AND circuits 179 to 182 output "H" pulses during one cycle of the first clock signal when the outputs of the fourth to seventh D-FFs 172 to 175 are inverted to "H".

However, the output of the two-input NAND circuit 166 constituting the inhibit circuit 146 becomes "L" immediately after the control means 9 is reset by the system reset signal. Accordingly, the first to fourth three-input AND circuits 179 to 182 do not output pulses.

When the output of the seventh D-FF 175 goes "H", the output of the SR-FF 169 constituting the booster control circuit 147 goes "H", and the first booster control signal serving as the output of the two-input AND circuit 177 goes "H" and the second booster control signal that is the output of the AND circuit 178 goes "L".

As a result, the first booster control input terminal zi1 shown in FIG. 11 goes "H", and the second booster control input terminal zi2 goes "L", thereby permitting the first booster circuit 15 constituting the booster means 2 to be in a charging state and permitting the second booster circuit 16 to be in a discharging state so that the capacitor of the storage means 3 is charged.

Since the output of the two-input AND circuit 168 constituting the inhibit circuit 146 is inputted into the clock terminal of the down counter 170 shown in FIG. 15, the down counter 170 starts counting down.

The output of the down counter 170 is inverted from "L" to "H" when all the outputs of the internal counter go "L", while the output of the third D-FF 171 goes "L" when the output of the down counter 170 goes "H". As a result, the outputs of the fourth to eighth D-FFs 172 to 176 go "L" while shifting every cycle of the first clock signal.

The inversion output of the seventh D-FF 175 and the output of the eighth D-FF 176 are inputted into the fifth three-input AND circuit 183. Accordingly, the "H" pulse is outputted to the enable terminal of the down counter 170 by way of the three-input OR circuit 167 during one cycle of the first clock signal when the output of the seventh D-FF 175 is inverted.

The down counter 170 presets the value of the hexadecimal "7" in the internal counter at the time of resetting the system when it receives the "H" signal at its enable terminal.

When the output of the seventh D-FF 175 goes "L", the first booster control signal serving as the output of the two-input AND circuit 177 constituting the booster control circuit 147 goes "L", while the second booster control signal that is the output of the AND circuit 178 goes "H".

As a result, since the first booster control input terminal zi1 shown in FIG. 11 goes "H" and the second booster control input terminal zi2 goes "H", the first booster circuit 15 constituting the booster means 2 is put in the discharging state so as to charge the capacitor of the storage means 3 shown in FIG. 10 and puts the second booster circuit 16 in the charging state.

The down counter 170 in FIG. 15 restarts counting down in response to a signal inputted into the clock terminal ck. When all the outputs of the internal counter go "L", the outputs thereof are inverted from "L" to "H". When the output of the down counter 170 goes "H", the output of the third D-FF 171 goes "H". As a result, the outputs of the fourth to eighth D-FFs 172 to 176 go "H" while shifting every cycle of the first clock signal.

At this time, the output of the two-input NAND circuit 166 constituting the inhibit circuit 146 becomes "H". Accordingly, the first to fourth three-input AND circuits 179 to 182 sequentially output pulse signals by one cycle of the first clock signal.

The output of the first three-input AND circuit 179 is inputted into the reset terminal R of the first SR-FF 150 constituting the up/down control circuit 145 so as to set the output of the first SR-FF 150 to "L" and to set the up/down counter 151 to the up counter.

The output of the second three-input AND circuit 180 is inputted into the gate terminal of the N-MOST 139 constituting the voltage detecting circuit 111 shown in FIG. 14 in response to the voltage detection control signal shown in FIG. 16 to make the N-MOST 139 conductive. At this time, the voltage as stored in the first capacitor 22 constituting the second booster circuit 16 of the booster means 2 shown in FIG. 11 is inputted to the voltage comparator terminal v, which is divided by two variable resistors 137 and 138. The divided voltage is inputted into the inversion input terminal of the comparator 140, in which the divided voltage is compared with the reference voltage Vr outputted by the reference voltage generating circuit 110. The result of comparison is inputted into the detection signal input terminal Vd of the signal generating circuit 112 shown in FIG. 15, and this is inputted into the set terminal S of the first SR-FF 150 constituting the up/down control circuit 145.

The detected signal is outputted as "L" signal, although it is not illustrated in the waveform in FIG. 16, and the output of the first SR-FF 150 shown in FIG. 15 goes "L" so that the up/down counter 151 is set to the up counter.

The output of the third three-input AND circuit 181 is inputted into the clock terminal CK of the up/down counter 151 constituting the up/down control circuit 145 so as to make the output of the up/down counter 151 a hexadecimal "8".

The output of the fourth three-input AND circuit 182 is inputted into the enable terminal EN of the down counter 170 by way of the three-input OR circuit 167 to make the hexadecimal "8" to be outputted from the up/down counter 151 to preset the internal counter of the down counter 170.

When the output of the seventh D-FF 175 goes "H", the output of the SR-FF 169 constituting the booster control circuit 147 goes "H", so that the first booster control signal that is the output of the two-input AND circuit 177 goes "H", and the second booster control signal that is the output of the AND circuit 178 goes "L".

As a result, the first booster control input terminal zi1 shown in FIG. 11 goes "H" and the second booster control input terminal zi2 goes "L" so that the first booster circuit 15 constituting the booster means 2 is set to the charging state by the power supply 1 while the second booster circuit 16 is set to the discharging state to charge the capacitor of the storage means 3 shown in FIG. 10.

When these operations are repeated, the voltage of the first capacitor 22 constituting the second booster circuit 16 of the booster means 2 shown in FIG. 11 and the reference voltage Vr outputted by the reference voltage generating circuit 110 shown in FIG. 14 are compared with each other by the comparator 140 constituting the voltage detecting circuit 111 in response to the voltage detection control signal (outputted through the voltage detection control signal terminal Vdc) outputted by the second three-input AND circuit 180.

The result of comparison is set to the up/down counter 151 constituting the up/down control circuit 145 in FIG. 15, thereby controlling the time involved in charging and discharging of the capacitors constituting the first and second booster circuits 15 and 16 of the booster means 2.

Figure 17:
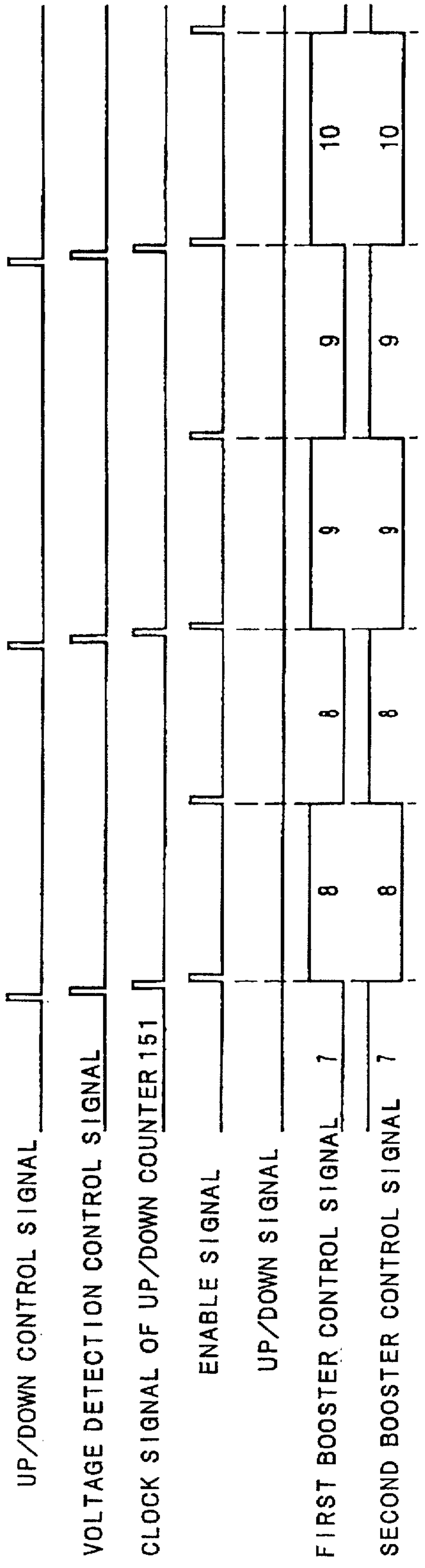
FIG. 17 are waveforms of signals issued by each element of a signal generating circuit in FIG. 15 in a case where charging and discharging times are increased.
Figure 18:
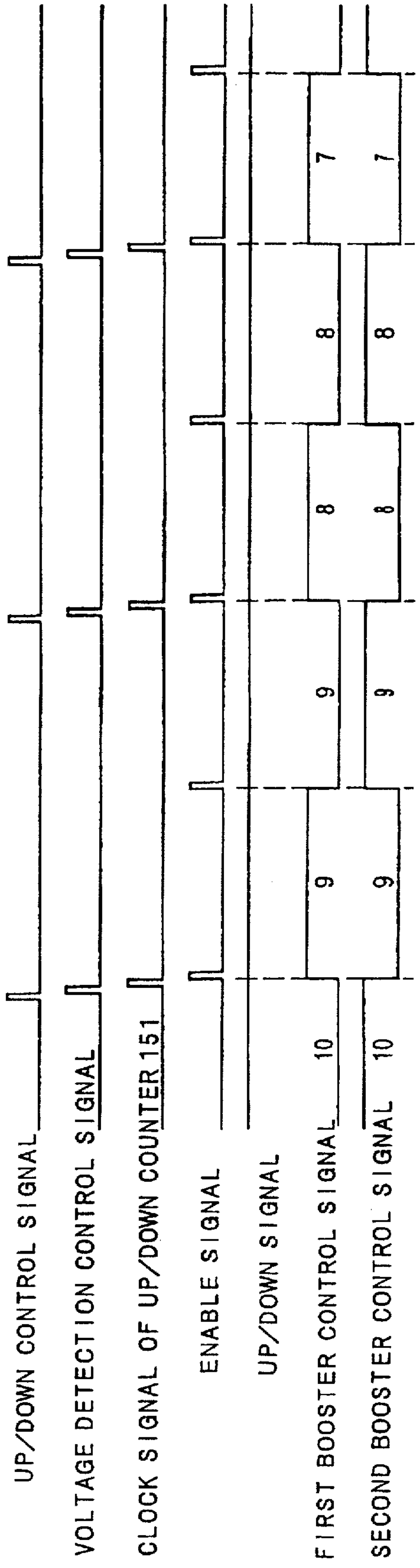
FIG. 18 shows waveforms of signals issued by each element of the signal generating circuit in FIG. 15 in a case where the charging and discharging times are decreased.

FIGS. 17 and 18 are waveforms of signals issued through elements of the signal generating circuit 112 of the electronic watch according to the second embodiment of the invention.

These figures show the up/down control signal that is the output of the first three-input AND circuit 179, the voltage detection control signal that is the output of the second three-input AND circuit 180, the enable signal that is the output of the three-input OR circuit 167, the clock signal of the up/down counter 151 that is the output of the third three-input AND circuit 181 constituting the frequency regulator circuit 148, the up/down signal of the up/down counter, the first booster control signal that is the output of the two-input AND circuit 177, and the second booster control signal that is the output of the two-input AND circuit 178 constituting the booster control circuit 147.

FIG. 17 shows waveforms showing the state where the charging and discharging times are increased, and FIG. 18 shows waveforms showing the state where the charging and discharging times are decreased.

The waveforms shown in FIG. 17 are those where the voltage of the first capacitor 22 constituting the second booster circuit 16 of the booster means 2 shown in FIG. 11 is less than the reference voltage Vr outputted by the reference voltage generating circuit 110 shown in FIG. 14 in the absolute value when the second three-input AND circuit 180 constituting the frequency regulator circuit 148 outputs the voltage detection control signal.

In this case, the comparator 140 constituting the voltage detecting circuit 111 shown in FIG. 14 always outputs the "L" signal. The first SR-FF 150 constituting the up/down control circuit 145 shown in FIG. 15 also always outputs the "L" signal so as to always set the up/down counter 151 to the up counter.

Accordingly, the first and second booster control signals are increased in duration every cycle of the second clock signal.

FIG. 18 are waveforms where the voltage of the first capacitor 22 constituting the second booster circuit 16 of the booster means 2 shown in FIG. 11 is larger than the reference voltage Vr outputted by the reference voltage generating circuit 110 shown in FIG. 14 in the absolute value when the second three-input AND circuit 180 constituting the frequency regulator circuit 148 outputs the voltage detection control signal.

The comparator 140 constituting the voltage detecting circuit 111 in FIG. 14 outputs the "H" when the voltage detection control signal is outputted. The first SR-FF 150 constituting the up/down control circuit 145 shown in FIG. 15 also outputs the "H" when the voltage detection control signal is outputted so as to always set the up/down counter 151 to the down counter.

Accordingly, the first and second booster control signals are decreased in duration every cycle of the second clock signal.

Figure 19:
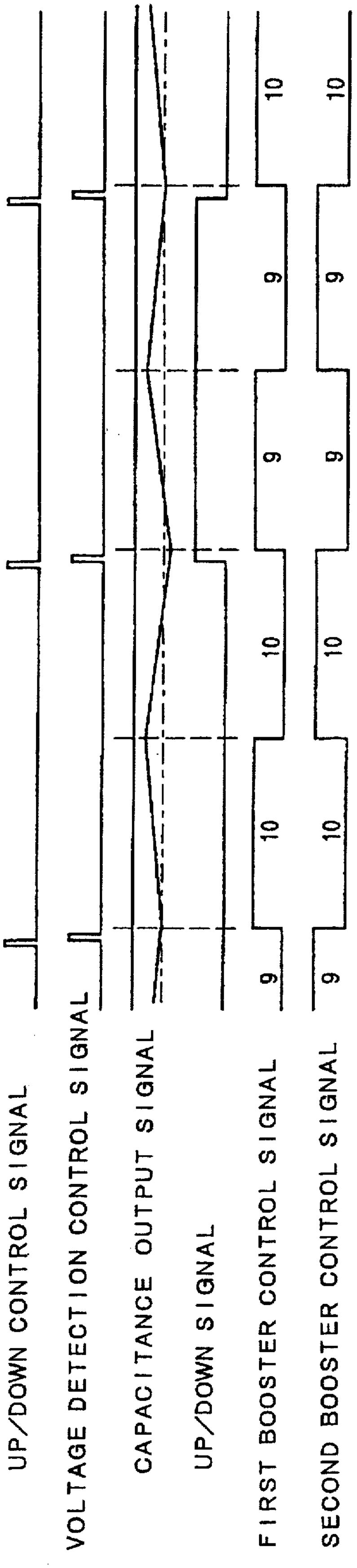
FIG. 19 are waveforms of each signal in charging and discharging states where a voltage generated by the power supply 1 is low.
Figure 20:
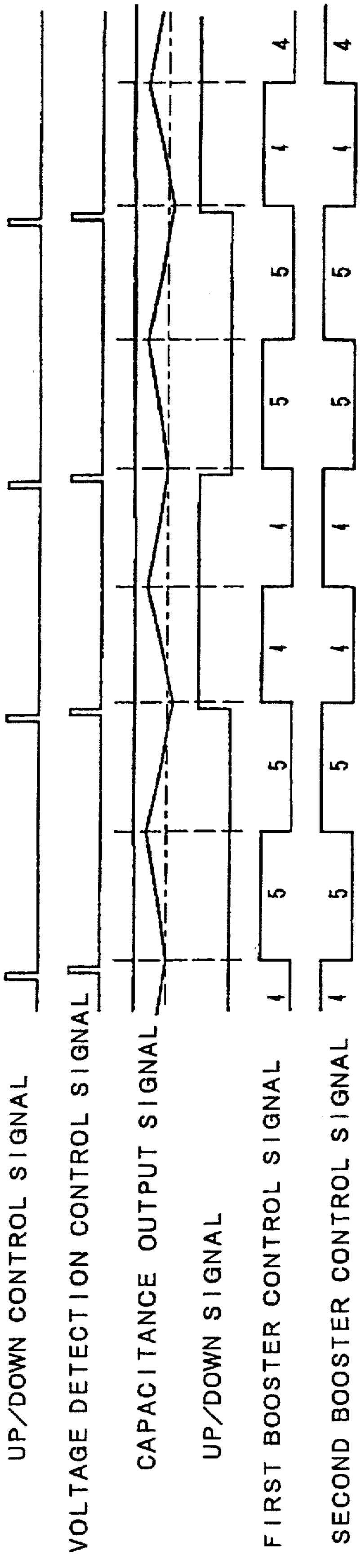
FIG. 20 are waveforms of each signal in charging and discharging states where the voltage generated by the power supply 1 is high.

FIGS. 19 and 20 are waveforms showing the state of charging and discharging involved in the variation of the voltage generated by the power supply of the electronic watch according to the second embodiment of the invention.

The waveforms in FIGS. 19 and 20 show the up/down control signal serving as output of the first three-input AND circuit 179 constituting the frequency regulator circuit 148 shown in FIG. 15, the first and second booster control signals serving as the outputs of the two-input AND circuits 177 and 178, the voltage detection control signal serving as the output of the second three-input AND circuit 180 constituting the booster control circuit 147, and the capacitance output signal of the first capacitor 22 constituting the second booster circuit 16 of the booster means 2 shown in FIG. 11.

FIG. 19 shows waveforms of signals at stable operations when the voltage generated by the power supply 1 is low.

FIG. 20 shows waveforms of signals at stable operations when the voltage generated by the power supply 1 is high.

In this case, since the voltage generated by the power supply 1 is low, the voltage of the capacitance output signal of the first capacitor 22 constituting the second booster circuit 16 is gradually increased. Accordingly, the time for reaching the reference voltage Vr outputted by the reference voltage generating circuit 110 is increased.

The waveforms shown in FIG. 20 represent that the voltage of the capacitance output signal of the first capacitor 22 constituting the second booster circuit 16 is quickly increased since the voltage generated by the power supply 1 is high. Accordingly, the time for reaching the reference voltage Vr outputted by the reference voltage generating circuit 110 is decreased.

The reference voltage Vr outputted by the reference voltage generating circuit 110 may not be constant, and it can be used by switching a plurality of reference voltages.

As mentioned above, the first and second booster circuits 15 and 16 of the booster means 2 shown in FIG. 11 are repeatedly alternately charged and discharged. Then, the charge voltage of the first capacitor 22 constituting the second booster circuit 16 is detected by the voltage detecting circuit 111 constituting the control means 9. Further, the cycles or frequencies of the first and second booster control signals which control the increase of voltage by the signal generating circuit 112 are increased or decreased. With such operations, the first and second capacitors 22 and 23 of the first and second booster circuits 15 and 16 are connected in series to each other, thereby supplying the charge voltage to the storage means 3.

When the charge voltage in the storage means 3 is increased, the reverse-blocking diode 8 is reversely biased to cut off the voltage. As a result, the clock output means 6 is electrically separated from the lower potential side terminal serving as the voltage supply terminal of the power supply 1 so that the driving energy of the clock output means 6 is fully supplied from the storage means 3.

The storage means 3 of the second embodiment may employ a secondary cell, particularly a lithium ion secondary cell including an anode composed of lithium-manganese composite oxide and a cathode composed of a lithium Titanium oxide. The lithium ion secondary cell has a size of 6.8 mm in diameter, 2.1 mm in thickness and has a voltage of 1.5 V, an electric capacitance of 1.2 mAh, and it is an optimum storage means as the electric watch is made so that the cell can be replaced.

The electric capacitance of the lithium ion secondary cell is largely dependent on the charge voltage and it is adapted for a voltage of 1.5 V to 2.6 V. Accordingly, the booster means 2 is controlled to vary the cycle or frequency of the booster control output of the control means 9 so that the charge voltage ranges from 1.5 V to 2.6 V.

It is also possible to use a chargeable means as the storage means 3 such as a capacitor having a large capacitance like an electric double layer capacitor instead of the secondary cell. When the electric double layer capacitor is employed, the voltage is increased as the charging progresses. Consequently, voltage dividers having a different voltage dividing ratio which vary the resistance values of the variable resistors 137 and 138 in FIG. 14 so as to increase the charge voltage of the booster means can be employed.

Whereupon the charge voltage to be stored in the storage means 3 is controlled by setting a detection level of the charge voltage of the booster circuit of the booster means 2 to one level by the voltage detecting circuit 111 of the control means 9. However, the detection voltage of the booster means 2 may be set to two levels, thereby setting the upper and lower limits of the charge voltage to be stored in the storage means 3, so that the boosting operation starts at the lower limit of the charge voltage and the cycle of the voltage increase is controlled at the upper limit thereof.

The booster means 2 of the second embodiment comprises two booster circuits. However, the booster means 2 may comprise three or more booster circuits wherein the first and second capacitors 22 and 23 are connected in series to each other for charging the storage means, and the other booster circuits may comprise the first and second *capacitors 22 and 23 which are connected to each other in parallel to the power supply for charging the storage means, so as to more effectively charge the storage means.

Still further, if the first to third TBBs 158, 159, and 160 constituting the up/down control circuit 145 of the control means 9 according to the second embodiment employ storage elements such as nonvolatile memory elements such as MONOSs or NMOSs or flush ROMs, it is possible to provide the electronic watch data which is rewritable.

Figure 21:
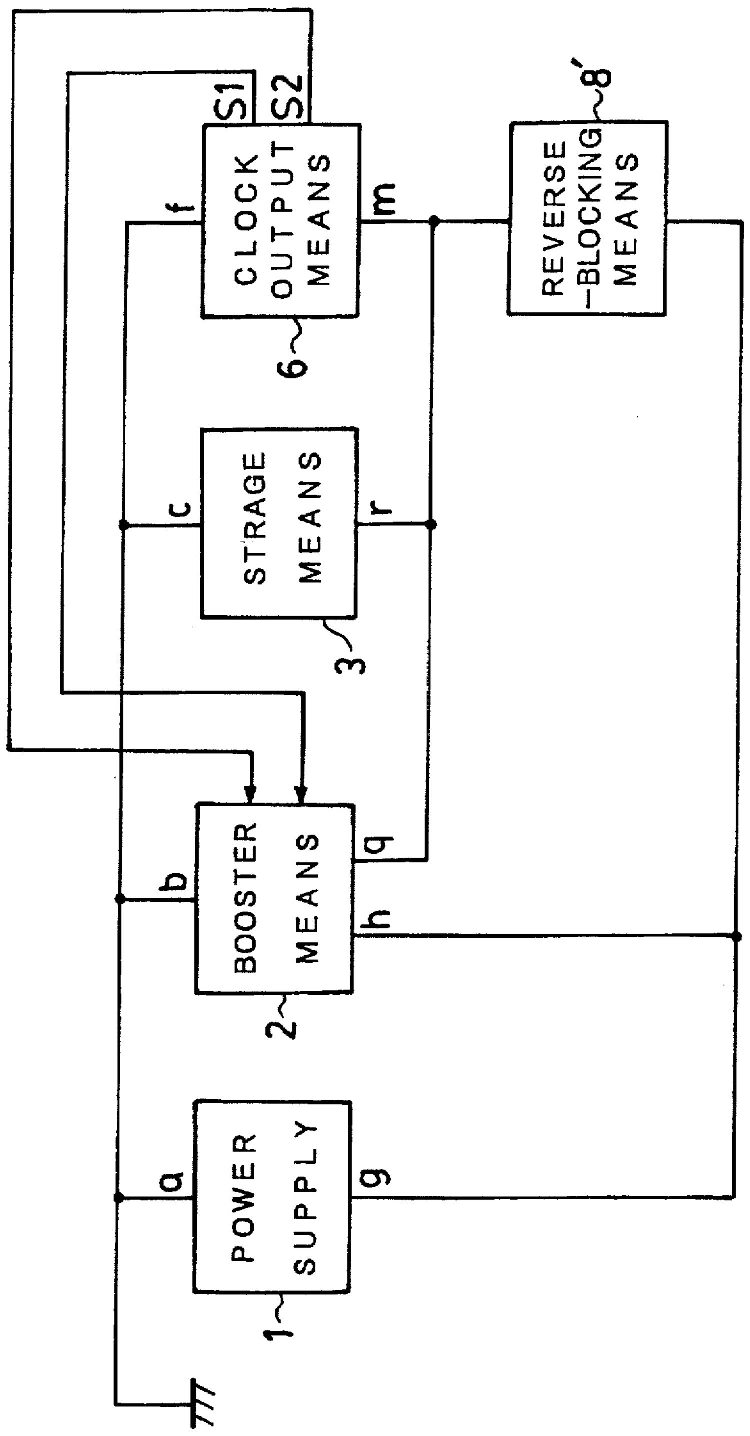
FIG. 21 is a block diagram showing a circuit arrangement of an electronic watch according to a third embodiment of the invention.

Third Embodiment (FIG. 21)

Although the first and second embodiments show examples for detecting the charge voltage to thereby control the charging or discharging of a plurality of booster circuits, the charging and discharging may be controlled by the charging time, which dispenses with the reference voltage generating circuit and the voltage detection circuit. If the internal resistance of the power supply is known in advance, it is possible to control the switching to each booster circuit so that the charging time is 2RC or less.

FIG. 21 is a block diagram showing such a circuit arrangement of the electronic watch according to the third embodiment of the invention, wherein elements corresponding to those shown in FIGS. 1 and 10 are denoted by the same numerals and the explanation thereof is omitted.

The third embodiment is different from the second embodiment in that the control means of the second embodiment shown in FIG. 10 is omitted, and the clock output means 6 controls the booster means 2 to switch the connection between a plurality of capacitors constituting a plurality of booster circuits to output the first and second booster control signals S1 and S2 for switching the charging state by the power supply 1 and the discharging state of the booster means 2 depending on the charging time.

With such an arrangement, there is an advantage that the circuit arrangement is very simplified so that it can be made cheaply.

Denoted by 8' is a reverse-blocking means which is the same as the reverse-blocking diode 8 shown in FIGS. 1 and 10, and it may be composed of a reverse-blocking element other than a diode. Accordingly, it is needless to say that other reverse-blocking element may be employed instead of the diode 8 in the electronic watch shown in FIGS. 1 and 10.

In each of the first to third embodiments, although the electrothermic type generator is employed by the power supply 1, a solar cell or an electromechanical generator for converting mechanical motion, caused by the motion of a human being wearing the electronic watch to electricity.

As described above, in the electronic watch of the invention, one booster circuit of at least two booster circuits is connected to the storage means for charging the storage means, the reverse-blocking means is reversely biased by the charge voltage, and the storage means is separated from the power supply, thereby preventing it from being influenced by the internal resistance of the power supply reducing the resistance value and also reducing the time constant, and also quickly charging the charge voltage of the booster circuit in the storage means.

Further, one of the booster circuits in the booster means is used for sequentially discharging the storage means, and other booster circuits are used for charging the storage means by connecting the internal capacitors in parallel to the power supply, thereby reducing the pulsation of the output voltage of the storage means.

Still further, the voltage of the capacitor in the booster circuit which is charged in response to the sampling signal from the clock output means is compared with the reference voltage at a portion adjacent to the transition point, and the capacitor of the booster circuit is sequentially switched to other circuits whenever the voltage of the capacitor exceeds the reference voltage so as to transfer the charge voltage into the storage means, thereby effectively performing the charging and discharging.

More further, the control means compares the voltage of the capacitor of the booster circuit with the reference voltage of the voltage detection circuit , and it decreases the cycle of the control output of the signal generating circuit or decreases the frequency when the voltage of the capacitor is larger than the reference voltage value, or it increases the cycle of the control output or decreases frequency when the voltage of the capacitor is less than reference voltage value, whereby the charged voltage in the storage means may set to the optimum value or charging efficiency can be enhanced.

Accordingly, it is possible to realize the electronic watch having an electric energy source as a power supply such as an electrothermic type generator which generates a relatively low voltage, and also generates little power, but has a large internal resistance.

What is claimed is:

1. An electronic watch comprising:

a power supply for generating electric energy by using external energy;

a booster means comprising at least two booster circuits for sequentially repeating charging by said power supply, boosting a charge voltage and discharging said boosted charge voltage;

a storage means for storing therein the charge discharged by said booster means;

a clock output means connected to an output terminal of said storage means, and also connected to said power supply by way of a reverse-blocking means for preventing said stored voltage from reversely flowing to said power supply; and a control means for outputting a control signal for switching between charging and discharging of each of said booster circuits constituting said booster means, wherein said control means include a reference voltage generating circuit and a voltage comparator circuit, and wherein a reference voltage generated by the reference voltage generating circuit is compared with a voltage which is charged in a capacitor of a charging booster circuit of said booster means so as to output said control signal.

2. An electronic watch according to claim 1, wherein an output terminal of said storage means is connected to said clock output means by way of a switching means, and further including a voltage comparator means, said voltage comparator means comparing a stored voltage in said storage means with a supply voltage of said power supply so as to turn off said switching means until said stored voltage reaches said supply voltage, and to turn on said switching means after the stored voltage reaches said supply voltage.

3. An electronic watch comprising:

a power supply for generating electric energy by using external energy;

a booster means comprising at least two booster circuits for sequentially repeating charging by said power supply, boosting a charge voltage and discharging said boosted charge voltage;

a storage means for storing therein the charge discharged by said booster means;

a clock output means connected to an output terminal of said storage means, and also connected to said power supply by way of a reverse-blocking means for preventing said stored voltage from reversely flowing to said power supply; and a control means for outputting a control signal for switching between charging and discharging of each of said booster circuits constituting said booster means, wherein said clock output means includes said control means for ou in charging each booster circuit constituting said booster means.

4. A method of driving an electronic watch, said electronic watch comprising:

a power supply for generating an electric energy by using external energy;

a booster means comprising at least two booster circuits including a plurality of capacitors;

a storage means for storing therein a charge discharged by said booster means;

a clock output means connected to an output terminal of said storage means, and also connected to said power supply by way of a reverse-blocking means for preventing said stored voltage from reversely flowing to said power supply; and a voltage comparator means including a reference voltage generating circuit and a voltage comparator circuit for comparing a reference voltage generated by said reference voltage generating circuit with a voltage charged in said capacitor of the charging booster circuit of said booster means, so as to output a control signal for switching between charging and discharging of said booster circuits constituting said booster means;

said method comprising:

connecting a plurality of internal capacitors of one of a plurality of booster circuits constituting said booster means in series to one another for discharging into said storage means, and connecting a plurality of internal capacitors of other booster circuits in parallel to said power supply for charging said storage means, comparing a voltage of a capacitor of said charging booster circuit with a reference voltage generated by said reference voltage generating circuit by said voltage comparator circuit in response to a sampling signal outputted by said clock output means, and sequentially discharging the voltage of said booster circuits into said storage means whenever said voltage exceeds said reference voltage.

5. A method of driving an electronic watch according to claim 4, wherein a voltage adjacent to a transition point of charging characteristics curve of each capacitor of a charging booster circuit is generated as a reference voltage in said reference voltage generating circuit.

6. An electronic watch comprising:

a power supply for generating electric energy by using external energy;

a booster means having at least two booster circuits for sequentially repeating charging by said power supply, and boosting a charged voltage and discharging said boosted voltage;

a storage means for storing therein a charge discharged by said booster means;

a clock output means connected to an output terminal of said storage means, and also connected to said power supply by way of a reverse-blocking means for preventing said stored voltage from reversely flowing to said power supply so as to output a clock signal; and a control means for controlling cycles of charging and discharging of each booster circuit constituting said booster means in response to said clock signal outputted by said clock output means and a voltage of a capacitor of said charging booster circuit in said booster means;

wherein said control means comprises a reference voltage generating circuit for generating a reference voltage, a voltage detection circuit for comparing said reference voltage and said voltage of said capacitor of said charging booster circuit in said booster means thereby outputting a detection signal, and a signal generating circuit for outputting a booster control signal for controlling cycles of charging and discharging of each booster circuit constituting said booster means in response to said detection signal and said clock signal.

7. An electronic watch according to claim 6, wherein said signal generating circuit comprises an up/down control circuit for determining a cycle of said booster control signal, a frequency regulator circuit operable in response to the cycle determined by said up/down control circuit, and a booster control circuit for outputting said booster control signal in response to an output of said frequency regulator circuit.

* * * * *